United States Patent
Guey et al.

(10) Patent No.: US 9,866,299 B2
(45) Date of Patent: *Jan. 9, 2018

(54) SYNCHRONIZATION IN A BEAMFORMING SYSTEM

(71) Applicant: MEDIATEK INC., Hsinchu (TW)

(72) Inventors: Jiann-Ching Guey, Hsinchu (TW); Chao-Cheng Su, Kaohsiung (TW); Ju-Ya Chen, Kaohsiung (TW)

(73) Assignee: MEDIATEK INC. (TW)

(*) Notice: Subject to any disclaimer, the term of this patent is extended or adjusted under 35 U.S.C. 154(b) by 122 days.

This patent is subject to a terminal disclaimer.

(21) Appl. No.: 14/725,138

(22) Filed: May 29, 2015

(65) Prior Publication Data
US 2016/0087765 A1 Mar. 24, 2016

Related U.S. Application Data

(60) Provisional application No. 62/054,485, filed on Sep. 24, 2014, provisional application No. 62/054,488, filed on Sep. 24, 2014.

(51) Int. Cl.
*H04B 7/06* (2006.01)
*H04J 11/00* (2006.01)
(Continued)

(52) U.S. Cl.
CPC ........ *H04B 7/0617* (2013.01); *H04J 11/0079* (2013.01); *H04L 5/005* (2013.01);
(Continued)

(58) Field of Classification Search
CPC ... H04B 7/0617; H04L 27/2613; H04L 5/005; H04L 5/0023; H04L 27/2607; H04J 11/0079; H04J 2011/0096
See application file for complete search history.

(56) References Cited

U.S. PATENT DOCUMENTS

| 7,453,946 B2 | 11/2008 | Sondur | 375/267 |
| 7,599,327 B2 | 10/2009 | Zhuang | 370/329 |

(Continued)

FOREIGN PATENT DOCUMENTS

| CN | 101431355 A | 5/2009 |
| CN | 101431490 A | 5/2009 |

(Continued)

OTHER PUBLICATIONS

USPTO, Office Action for related U.S. Appl. No. 14/725,159 dated Sep. 13, 2016 (36 pages).

(Continued)

*Primary Examiner* — Jackie Zuniga Abad
*Assistant Examiner* — Justin T Van Roie
(74) *Attorney, Agent, or Firm* — Imperium Patent Works; Zheng Jin

(57) ABSTRACT

A beamforming system synchronization architecture is proposed to allow a receiving device to synchronize to a transmitting device in time, frequency, and spatial domain in the most challenging situation with very high pathloss. A periodically configured time-frequency resource blocks in which the transmitting device uses the same beamforming weights for its control beam transmission to the receiving device. A pilot signal for each of the control beams is transmitted in each of the periodically configured time-frequency resource blocks. The same synchronization signal can be used for all stages of synchronization including initial coarse synchronization, device and beam identification, and channel estimation for data demodulation.

19 Claims, 21 Drawing Sheets

(51) Int. Cl.
*H04L 5/00* (2006.01)
*H04L 27/26* (2006.01)

(52) U.S. Cl.
CPC ........ *H04L 5/0023* (2013.01); *H04L 27/2613* (2013.01); *H04J 2011/0096* (2013.01); *H04L 27/2607* (2013.01)

(56) References Cited

U.S. PATENT DOCUMENTS

| | | | |
|---|---|---|---|
| 9,148,327 B1 | 9/2015 | Harris | |
| 2002/0061768 A1 | 5/2002 | Liang et al. | 455/561 |
| 2002/0146029 A1 | 10/2002 | Kavak et al. | 370/441 |
| 2005/0047347 A1 | 3/2005 | Lee et al. | 370/241 |
| 2005/0047530 A1 | 3/2005 | Lee et al. | 375/343 |
| 2005/0105485 A1 | 5/2005 | Cleveland | 370/320 |
| 2005/0136980 A1 | 6/2005 | Kim et al. | 455/562.1 |
| 2005/0239475 A1 | 10/2005 | Voltolina | 455/456.1 |
| 2005/0243940 A1 | 11/2005 | Huh et al. | 375/260 |
| 2006/0276229 A1 | 12/2006 | Braun et al. | 455/562.1 |
| 2006/0292994 A1 | 12/2006 | Oura et al. | 455/67.16 |
| 2007/0037529 A1 | 2/2007 | Nagai et al. | 455/101 |
| 2007/0135052 A1 | 6/2007 | Park et al. | 455/63.1 |
| 2007/0201354 A1 | 8/2007 | Oh et al. | 370/210 |
| 2007/0263743 A1 | 11/2007 | Lee et al. | 375/267 |
| 2008/0081671 A1 | 4/2008 | Wang et al. | 455/562.1 |
| 2008/0303508 A1 | 12/2008 | Kwak et al. | 324/76.52 |
| 2009/0097576 A1 | 4/2009 | Adachi et al. | 375/260 |
| 2009/0116569 A1 | 5/2009 | Jin | 375/260 |
| 2009/0161772 A1 | 6/2009 | Sawahashi et al. | 375/260 |
| 2009/0196203 A1 | 8/2009 | Taira et al. | 370/280 |
| 2009/0203405 A1 | 8/2009 | Horneman et al. | 455/562.1 |
| 2009/0225879 A1 | 9/2009 | Kloos et al. | 375/260 |
| 2009/0252112 A1 | 10/2009 | Shimomura et al. | 370/330 |
| 2009/0322614 A1 | 12/2009 | Na et al. | 342/377 |
| 2010/0002571 A1 | 1/2010 | Liao et al. | 370/208 |
| 2010/0020702 A1 | 1/2010 | Wong et al. | 370/252 |
| 2010/0111226 A1 | 5/2010 | Ko et al. | 375/299 |
| 2010/0142390 A1 | 6/2010 | Sun et al. | 370/252 |
| 2010/0142466 A1 | 6/2010 | Palanki et al. | 370/329 |
| 2010/0149963 A1 | 6/2010 | Bae et al. | 370/210 |
| 2010/0177723 A1 | 7/2010 | Kim et al. | 370/329 |
| 2010/0296596 A1 | 11/2010 | Miyamoto | 375/260 |
| 2010/0303130 A1 | 12/2010 | Moh | 375/135 |
| 2011/0033012 A1 | 2/2011 | Matsuoka et al. | 375/340 |
| 2011/0044408 A1 | 2/2011 | Ahmad | 375/340 |
| 2011/0045792 A1 | 2/2011 | Na et al. | 455/272 |
| 2011/0170521 A1 | 7/2011 | Wang et al. | 370/336 |
| 2011/0182376 A1 | 7/2011 | Abe et al. | 375/340 |
| 2011/0216734 A1 | 9/2011 | Yu | 370/330 |
| 2011/0280333 A1 | 11/2011 | Yang et al. | 375/295 |
| 2012/0027111 A1 | 2/2012 | Vook et al. | 375/267 |
| 2012/0039321 A1 | 2/2012 | Ghosh et al. | 370/338 |
| 2012/0182895 A1 | 7/2012 | Jwa | 370/252 |
| 2012/0307726 A1 | 12/2012 | Pi et al. | 370/328 |
| 2013/0051302 A1 | 2/2013 | Kim | 370/312 |
| 2013/0051364 A1 | 2/2013 | Seol et al. | 370/331 |
| 2013/0064239 A1 | 3/2013 | Yu et al. | 370/350 |
| 2013/0102345 A1 | 4/2013 | Jung | 455/513 |
| 2013/0156120 A1 | 6/2013 | Josiam et al. | 375/260 |
| 2013/0156127 A1 | 6/2013 | Schilling | 375/295 |
| 2013/0195042 A1 | 8/2013 | Taori et al. | 370/329 |
| 2013/0279403 A1 | 10/2013 | Takaoka et al. | 370/328 |
| 2013/0286960 A1 | 10/2013 | Li et al. | 370/329 |
| 2013/0322563 A1 | 12/2013 | Van Zelst et al. | 375/295 |
| 2013/0336133 A1 | 12/2013 | Carbonelli et al. | 370/252 |
| 2014/0177607 A1 | 6/2014 | Li et al. | 370/336 |
| 2014/0302856 A1 | 10/2014 | Nory et al. | 455/454 |
| 2014/0348271 A1 | 11/2014 | Ma et al. | 375/340 |
| 2015/0282178 A1 | 10/2015 | Kim et al. | 370/329 |
| 2015/0365814 A1 | 12/2015 | El Ayach et al. | 370/254 |
| 2015/0365975 A1 | 12/2015 | Sahlin et al. | 370/252 |
| 2016/0043781 A1 | 2/2016 | Cho et al. | 342/373 |
| 2016/0072654 A1 | 3/2016 | Choi et al. | 370/329 |
| 2016/0197659 A1 | 7/2016 | Yu et al. | 370/335 |
| 2016/0212631 A1 | 7/2016 | Shen et al. | 370/351 |
| 2017/0006638 A1 | 1/2017 | Sahlin et al. | 370/329 |

FOREIGN PATENT DOCUMENTS

| | | |
|---|---|---|
| CN | 101459453 A | 6/2009 |
| CN | 101523736 A | 9/2009 |
| CN | 101674119 A | 3/2010 |
| CN | 101803320 A | 8/2010 |
| CN | 101931896 A | 12/2010 |
| CN | 103475606 A | 12/2013 |
| CN | 103782524 A | 5/2014 |
| CN | 103891161 A | 6/2014 |
| CN | 104052535 A | 9/2014 |
| EP | 1583277 A1 | 10/2005 |
| WO | WO2007069203 | 6/2007 |
| WO | WO2007069203 A2 | 6/2007 |
| WO | WO2011143634 A1 | 11/2011 |

OTHER PUBLICATIONS

USPTO, Office Action for related U.S. Appl. No. 14/723,689 dated Sep. 29, 2016 (11 pages).
USPTO, Office Action for related U.S. Appl. No. 14/725,159 dated May 5, 2016 (26 pages).
USPTO, Office Action for related U.S. Appl. No. 14/725,183 dated Jul. 7, 2016 (12 pages).
International Search Report and Written Opinion of International Search Authority for PCT/CN2015/089705 dated Nov. 26, 2015 (11 pages).
International Search Report and Written Opinion of International Search Authority for PCT/CN2015/087893 dated Dec. 11, 2015 (11 pages).
International Search Report and Written Opinion of International Search Authority for PCT/CN2015/089704 dated Dec. 21, 2015 (13 pages).
USPTO, Office Action for related U.S. Appl. No. 14/725,159 dated Oct. 8, 2015 (22 pages).
USPTO, Office Action for related U.S. Appl. No. 14/725,183 dated Nov. 5, 2015 (13 pages).
International Search Report and Written Opinion of International Search Authority for PCT/CN2015/087315 dated Nov. 17, 2015 (11 pages).
International Search Report and Written Opinion of International Search Authority for PCT/CN2015/CN2015/087894 dated Nov. 6, 2015 (11 pages).
USPTO, Office Action for related U.S. Appl. No. 14/725,159 dated May 24, 2017 (9 pages).
EPO, Search Report for the EP patent application 15843580.0 dated May 22, 2017 (7 pages).
EPO, Search Report for the EP patent application 17150488.9 dated May 26, 2017 (10 pages).
Mitsubishi Electric: "3rd Generation Partnership Project; Technical Specification Group Radio Access Network; Physical layer aspects for evolved Universal Terrestrial Radio Access (UTRA); (Release 7)", 3GPP TR 25.814 V7.0.0, (Jun. 1, 2006), pp. 40-44.
Erik Dahlman et al.: "Downlink Physical-Layer Processing—Chapter 10" In: "4G LTE/LTE-Advanced for Mobile Broadband," (Oct. 7, 2013), Elsevier, pp. 161-240.
USPTO, Office Action for related U.S. Appl. No. 14/723,706 dated Feb. 13, 2017 (14 pages).
EPO, Search Report for the EP patent application 15845294.6 dated Sep. 25, 2017 (8 pages).
Erik Dahlman et al., "Downlink Physical-Layer Processing—Chapter 10", In: "4G LTE/LTE-Advanced for mobile Broadband" (Oct. 7, 2013), pp. 161-240.

GUARD TIME

SYNCHRONIZATION IN A BEAMFORMING SYSTEM

CROSS REFERENCE TO RELATED APPLICATIONS

This application claims priority under 35 U.S.C. §119 from U.S. Provisional Application No. 62/054,485, entitled "Control Signaling in a Beamforming System," filed on Sep. 24, 2014; U.S. Provisional Application No. 62/054,488, entitled "Synchronization in a Beamforming System," filed on Sep. 24, 2014, the subject matter of which is incorporated herein by reference.

TECHNICAL FIELD

The disclosed embodiments relate generally to wireless communication, and, more particularly, to control signaling and synchronization in a Millimeter Wave (mmW) beamforming system.

BACKGROUND

The bandwidth shortage increasingly experienced by mobile carriers has motivated the exploration of the underutilized Millimeter Wave (mmW) frequency spectrum between 3G and 300G Hz for the next generation broadband cellular communication networks. The available spectrum of mmW band is two hundred times greater than the conventional cellular system. The mmW wireless network uses directional communications with narrow beams and can support multi-gigabit data rate. The underutilized bandwidth of the mmW spectrum has wavelengths ranging from 1 mm to 100 mm. The very small wavelengths of the mmW spectrum enable large number of miniaturized antennas to be placed in a small area. Such miniaturized antenna system can produce high beamforming gains through electrically steerable arrays generating directional transmissions.

With recent advances in mmW semiconductor circuitry, mmW wireless system has become a promising solution for real implementation. However, the heavy reliance on directional transmissions and the vulnerability of the propagation environment present particular challenges for the mmW network. In general, a cellular network system is designed to achieve the following goals: 1) Serve many users with widely dynamical operation conditions simultaneously; 2) Robust to the dynamics in channel variation, traffic loading and different QoS requirement; and 3) Efficient utilization of resource such as bandwidth and power. Beamforming adds to the difficulty in achieving these goals. A robust control-signaling scheme is thus required to facilitate the beamforming operation in a challenging environment.

In cellular networks, pilot signals are needed for device identification and time-frequency synchronization. Primary synchronization signal is a unique signal with smaller search space, which can be used for first stage synchronization to achieve coarse frame boundary and frequency synchronization. Secondary synchronization signal is a unique signal with larger search space, which can be used for second stage synchronization to identify device and achieve fine (symbol level) timing and frequency synchronization. Reference signal is used for channel estimation and demodulation of data symbols. The three types of pilot signals for time-frequency synchronization and channel estimation introduce too much overhead. Furthermore, spatial synchronization is not considered in existing solutions (e.g., LTE). Future systems operate in much higher carrier frequency band that requires beamforming with very narrow beam width. As a result, synchronization signals need to align with TX and RX beams under spatial synchronization.

A beamforming system synchronization architecture is sought to allow the receiving devices to synchronize to the transmitting devices in time, frequency, and spatial domains in the most challenging situation.

SUMMARY

A beamforming system synchronization architecture is proposed to allow the receiving device to synchronize to the transmitting device in time, frequency, and spatial domain in the most challenging situation with very high pathloss. A periodically configured time-frequency resource blocks in which the transmitting device uses the same beamforming weights for its control beam transmission to the receiving device. A pilot signal for each of the control beams is transmitted in each of the periodically configured time-frequency resource blocks. The same synchronization signal can be used for all stages of synchronization including initial coarse synchronization, device and beam identification, and channel estimation for data demodulation. Pilot symbols are inserted into pilot structures and repeated for L times in each pilot structure. The L repetitions can be implemented by one or more Inverse Fast Fourier Transfers (IFFTs) with corresponding one or more cyclic prefix (CP) lengths. A detector at the receiving device detects the presence of the control beams, synchronizes to the transmission and estimates the channel response by receiving the pilot signals. The detector at the receiving device has low complexity when exploiting the structure of the synchronization signals. It consists of three stages that break down the synchronization procedure into less complicated steps. It accurately estimates the parameters required for identifying the transmit device and performing subsequent data communication.

In one embodiment, a base station allocates a set of control resource blocks in a beamforming OFDM network. The set of control resource blocks comprises periodically allocated time-frequency resource blocks associated with a set of beamforming weights to form a control beam. The base station partitions each resource block into a pilot part and a data part. Each pilot part is divided into M pilot structures and each pilot structure comprises L OFDM symbols. Pilot symbols are inserted once every K subcarriers for R times in each of the L OFDM symbol to form the pilot part while data symbols are inserted in the remaining resource elements to form the data part. The variables M, L, K, and R are all positive integers. The base station then transmits the pilot symbols and the data symbols via the control beam to a plurality of user equipments (UEs). The M pilot structures have a similar structure with a different offset $v_m$ and a different sequence $s_m$. Each control beam of a cell is identified by the pilot symbols having a hopping pattern based on $v_m$ and a signature sequence $s_m$. Specifically, for the j-th control beam of the i-th cell, there is a corresponding identifier pair $v_m(i,j)$ and $s_m(i,j)[n]$.

In another embodiment, a base station allocates time-frequency resource blocks in a beamforming OFDM network for control beam (CB) transmission. The base station partitions each resource block into a pilot part and a data part. The pilot part comprises M pilot structures and each pilot structure comprises a number of OFDM symbols in time domain and a number of subcarriers in frequency domain. The base station then inserts pilot symbols of a pilot signal in each OFDM symbol in the pilot part. The pilot symbols are repeated for L times in each pilot structure, and each pilot structure is applied by one or more Inverse Fast Fourier Transfers (IFFTs) with corresponding one or more variable cyclic prefix (CP) lengths for CB transmission. A user equipment (UE) receives control beam transmission from the base station. The UE receives a time domain signal from pilot symbols that are transmitted over periodically allocated time-frequency resource blocks of a control beam. The UE processes the time domain signal by removing one or more cyclic prefixes (CPs) with a variable CP length and performing corresponding one or more variable-length Fast Fourier Transfers (FFTs) to reconstruct a pilot part of a resource block, wherein the pilot part comprises M pilot structures and each pilot structure comprises a number of OFDM symbols in time domain and a number of subcarriers in frequency domain. The UE then extracts the pilot symbols from each pilot structure. The pilot symbols are repeated for L times in each pilot structure.

In yet another embodiment, a user equipment (UE) receives control beam transmissions from a base station in a beamforming OFDM network. A pilot signal is transmitted over periodically allocated time-frequency resource blocks of a control beam in a cell. The UE processes pilot symbols carried in a pilot part of a resource block, the pilot part comprises M pilot structures and each pilot structure comprises L OFDM symbols in time domain and R subcarriers in frequency domain. The pilot symbols are inserted once every K subcarriers for R times in each OFDM symbol, and M, L, R, and K are positive integers. The UE then detects the control beam and the pilot signal based on the control beam transmission.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
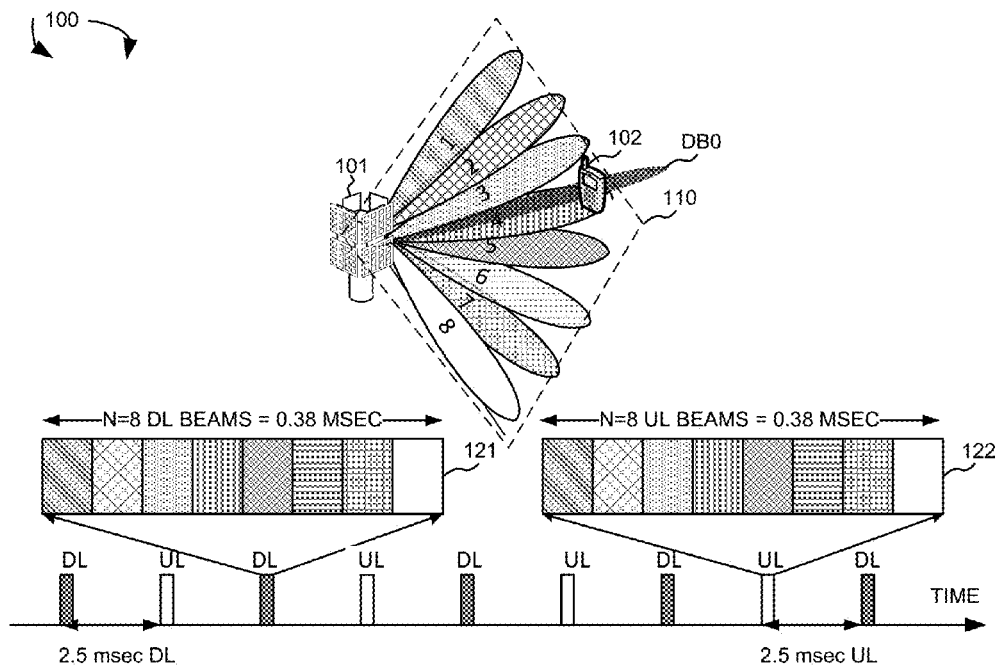
FIG. 1 illustrates control beams in a beamforming system in accordance with one novel aspect.

FIG. 1 illustrates control beams in a beamforming Millimeter Wave (mmWave) cellular network 100 in accordance with one novel aspect. Beamforming network 100 comprises a base station BS 101 and a user equipment UE 102. The mmWave cellular network uses directional communications with narrow beams and can support multi-gigabit data rate. Directional communications are achieved via digital and/or analog beamforming, wherein multiple antenna elements are applied with multiple sets of beamforming weights to form multiple beams. For control purpose, a set of coarse TX/RX control beams are provisioned by the base station in the cellular system. The set of control beams may be periodically configured or occur indefinitely and repeatedly in order known to the UEs. The set of control beams covers the entire cell coverage area with moderate beamforming gain. Each control beam broadcasts a minimum amount of beam-specific information similar to Master Information Block or System Information Block (MIB or SIB) in LTE. Each beam may also carry UE-specific control or data traffic. Each beam transmits a set of known signals for the purpose of initial time-frequency synchronization, identification of the control beam that transmits the signals, and measurement of radio channel quality for the beam that transmits the signals.

In the example of FIG. 1, BS 101 is directionally configured with multiple cells, and each cell is covered by a set of coarse TX/RX control beams. In one embodiment, cell 110 is covered by eight control beams CB0 to CB7. Each control beam comprises a set of downlink resource blocks, a set of uplink resource blocks, and a set of associated beamforming weights with moderate beamforming gain. In the example of FIG. 1, different control beams are time division multiplexed (TDM) in time domain. A downlink subframe 121 has eight DL control beams occupying a total of 0.38 msec. An uplink subframe 122 has eight UL control beams occupying a total of 0.38 msec. The interval between the DL subframe and the UL subframe is 2.5 msec. The set of control beams are lower-level control beams that provide low rate control signaling to facilitate high rate data communication on higher-level data beams. For example, UE 102 performs synchronization with BS 101 via control beam CB4, and exchanges data traffic with BS 101 via dedicated data beam DB0. The control beam and data beam architecture provides a robust control-signaling scheme to facilitate the beamforming operation in mmWave cellular network systems.

Figure 2:
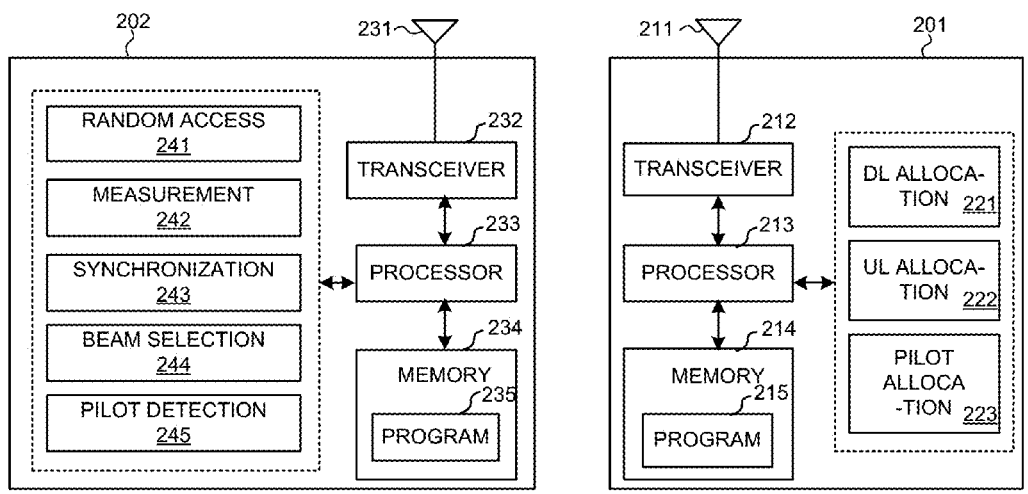
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules that carry out different tasks in accordance with embodiments of the current invention.

The functional modules can be implemented and configured by hardware, firmware, software, and any combination thereof. For example, from BS side, DL allocation module 221 and UL allocation module 222 allocates control radio resource blocks for the control beams, and pilot allocation module 223 allocates radio resources for transmitting pilot signals. Note that the term "allocate" can be an explicit action performed by the BS to configure and reserve certain resource blocks, but it can also be an implicit action of following a predefined agreement based on a standard specification. From UE side, pilot detection module 245 detects pilot signals, extract pilot symbols, and identify control beams from received control beam transmission, beam selection module 244 selects a preferred control beam from received control beam transmission, synchronization module 243 performs time and frequency synchronization with the BS using the selected control beam, measurement module 242 measures radio signals for different control beams and cells, and random access module 241 performs channel access for establishing connection with the BS.

Figure 3:
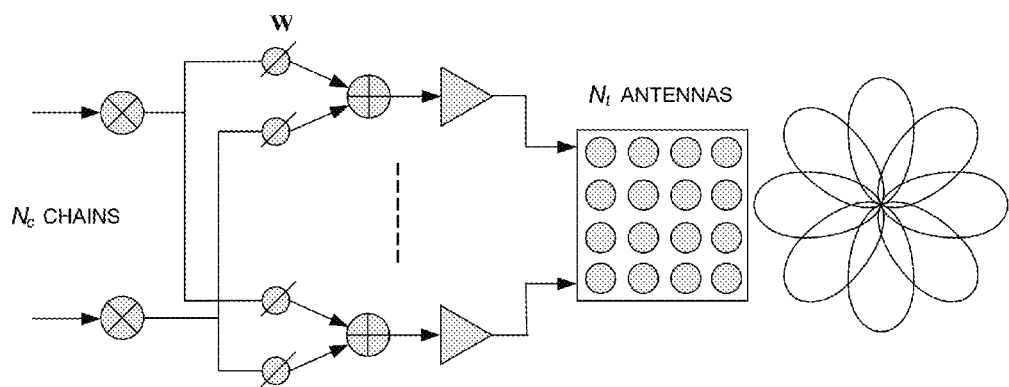
FIG. 3 illustrates beamforming weights applied to multiple antenna elements in a beamforming system.

FIG. 3 illustrates beamforming weights applied to multiple antenna elements in a beamforming system. Through directional antenna technology, complex beamforming weights are adjusted and then applied to the signals transmitted or received by the multiple antenna elements to focus the transmitting or receiving radiation power to the desire direction. The beamforming weights W can be applied in analog domain in the RF chain Nc (e.g., as illustrated in FIG. 3), or applied in digital domain at the baseband (not shown) depending on the transceiver architecture. Multiple sets of complex weights can be applied to the multiple antenna elements Nt, forming one beam at a time or multiple beams simultaneously.

Figure 4:
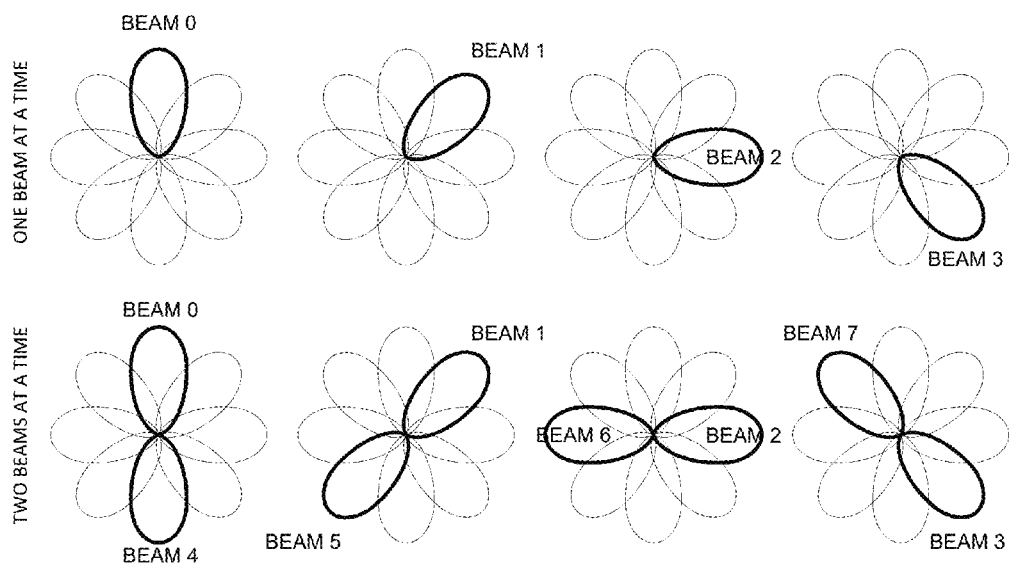
FIG. 4 illustrates multiple sets of beamforming weights applied to antenna elements one beam at a time or two beams at a time.

FIG. 4 illustrates multiple sets of beamforming weights applied to antenna elements to form one beam at a time or two beams at a time. In the top row of FIG. 4, the base station forms one beam at a time by applying one set of weights. Beams 0, 1, 2, and 3 are sequentially formed one at a time. In the bottom row of FIG. 4, the base station forms two beams at a time by applying two sets of weights. Beams 0/4, 1/5, 2/6, and 3/7 are sequentially formed two at a time.

Figure 5:
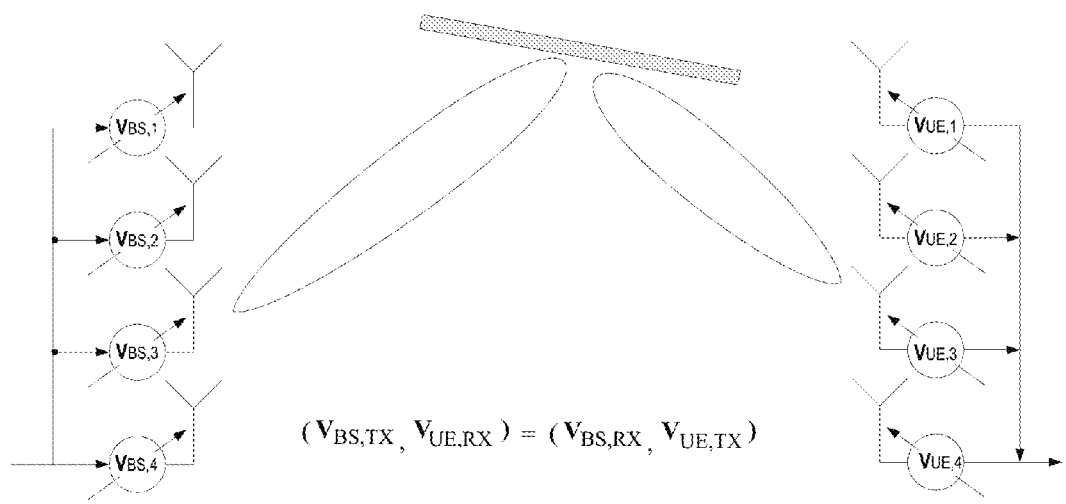
FIG. 5 illustrates spatial reciprocity of DL and UL transmission in a beamforming system.

FIG. 5 illustrates spatial reciprocity of DL and UL transmission in a beamforming system. It is generally assumed that the downlink channel and the uplink channel is spatially reciprocal in the beamforming system. This is typically true for Time division duplex (TDD) systems and for most Frequency division duplex (FDD) systems if the frequency spacing is less than tenth of the total channel bandwidth. Under spatially reciprocal beamforming, the same beamformed antenna pattern is used for reception and transmission. As illustrated in FIG. 5, for downlink transmission, the BS applies TX beamforming vector $V_{BS,TX}$ and the UE applies RX beamforming vector $V_{UE,RX}$. For uplink transmission, the BS applies RX beamforming vector $V_{BS,RX}$ and the UE applies TX beamforming vector $V_{UE,TX}$. Under spatially reciprocal beamforming, the beamforming vectors for downlink and uplink are the same, e.g., $(V_{BS,TX}, V_{UE,RX})=(V_{BS,RX}, V_{UE,TX})$.

Figure 6:
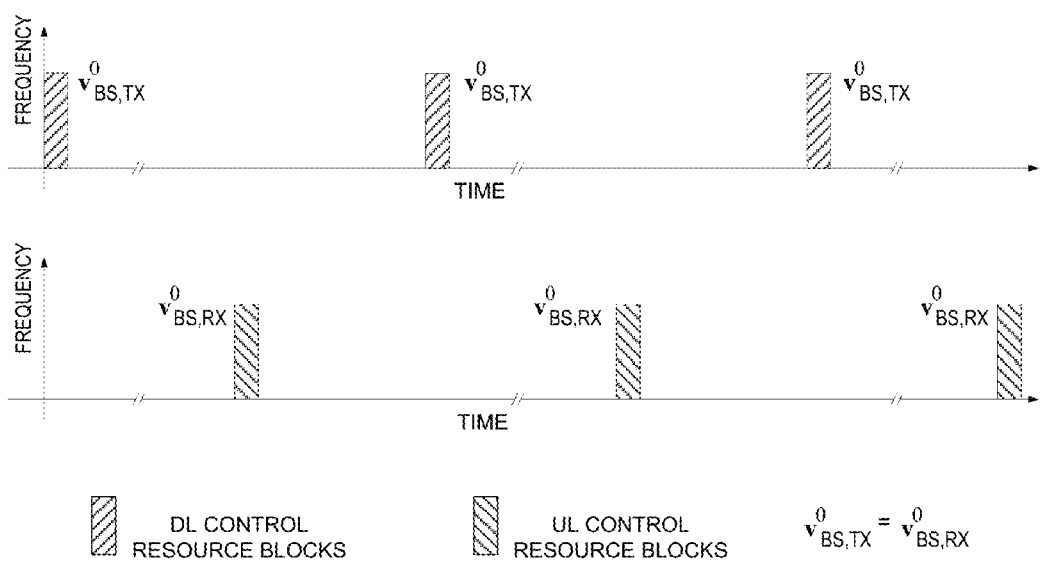
FIG. 6 illustrates control beams in a cell comprising DL control resource blocks and UL control resource blocks.

FIG. 6 illustrates control beams in a cell comprises DL control resource blocks and UL control resource blocks and associated beamforming vectors. As a general concept, a downlink control beam is defined as a set of time-frequency resource blocks in which the base station uses the same beamforming weights set for its downlink transmission to the receiving UEs. The said time-frequency resource blocks, referred to as downlink (DL) control resource blocks, may be periodically configured or occur indefinitely in order known to the UEs. The periodically configured downlink control resource blocks for downlink control beam CB0 is depicted in the top half diagram of FIG. 6, where $V^0_{BS,TX}$ represents the beamforming vector for downlink CB0.

Similarly, an uplink control beam is defined as a set of time-frequency resource blocks in which the base station preferably chooses the same beamforming weights set as the one used by the corresponding DL control resource blocks for its reception of the UEs' uplink transmission. The said time-frequency resource blocks, referred to as uplink (UL) control resource blocks, may be periodically configured or occur indefinitely in order known to the UEs. The periodically configured uplink control resource blocks for uplink control beam CB0 is depicted in the bottom half diagram of FIG. 6, where $V^0_{BS,RX}$ represents the beamforming vector for uplink CB0. Because of spatial reciprocity, the beamforming vectors are the same ($V^0_{BS,TX}=V^0_{BS,RX}$). If the base station chooses not to use the corresponding transmit beamforming weights set as its receive beamforming weights set in the UL control resource block, then it should use a beamforming weights set that achieves better performance than the beamforming weights set associated with the DL control resource blocks.

Figure 7:
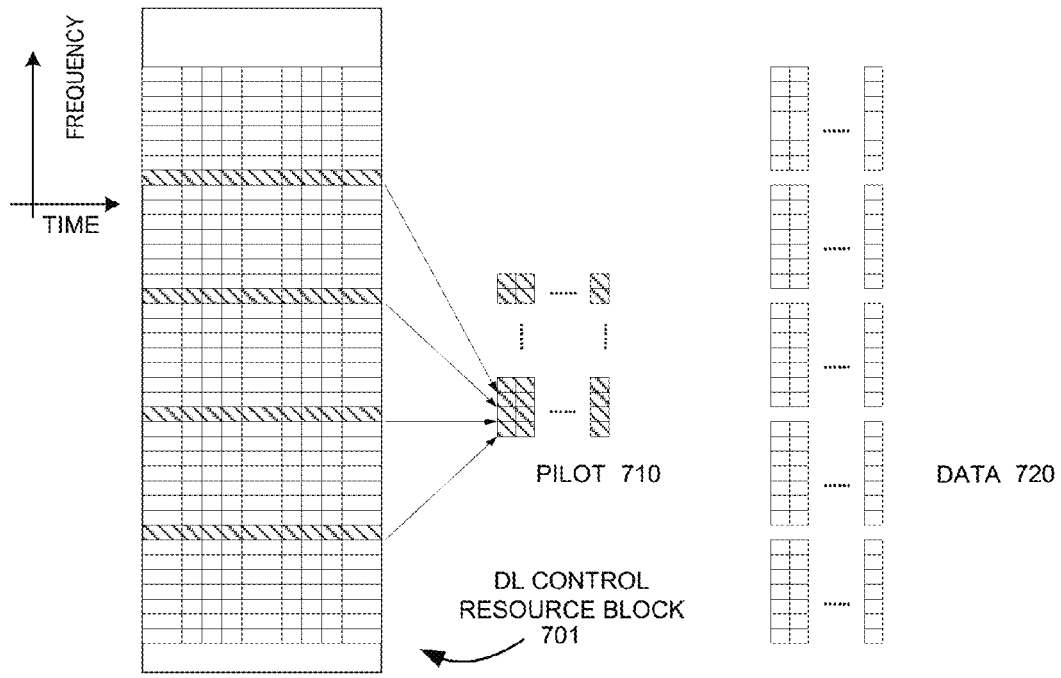
FIG. 7 illustrates one embodiment of DL control resource block associated with a control beam.

FIG. 7 illustrates one embodiment of a DL control resource block associated with a control beam. Each DL control resource block associated with a control beam comprises at least a pilot part and a data part transmitted by the base station. For example, DL control resource block 701 comprises pilot part 710 and data part 720. The pilot part is used for identification of the cell and the control beam, and for time, frequency, and spatial synchronization. The data part is used for cell-specific broadcast, beam-specific broadcast, UE-specific control data, and UE-specific traffic data.

Figure 8:
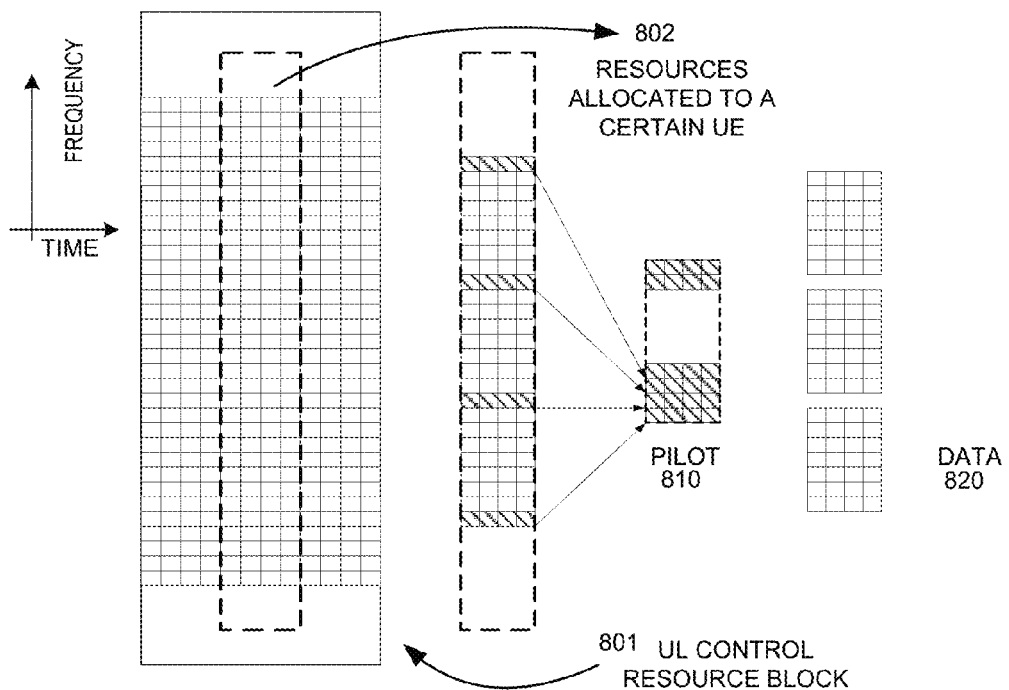
FIG. 8 illustrates one embodiment of UL control resource block associated with a control beam.

FIG. 8 illustrates one embodiment of an UL control resource block associated with a control beam. Each UL control resource block comprises resources allocated to a certain UE. The transmission of a UE in the UL control resource block comprises at least a pilot part and a data part. For example, UL control resource block 801 comprises resources 802 that includes pilot part 810 and data part 820. The pilot part is used for identification of the UE, and for the base station to achieve time, frequency, and spatial synchronization to the UE's uplink transmission. The data part is used for UE-specific control data and UE-specific traffic data.

The transmission of a UE in the UL control resource block may employ transmit beamforming when equipped with multiple antennas. The transmit beamforming weights set used by the UE for the transmitting in the UL control resource block should preferably be the same as the receive beamforming weights set used by the UE for the reception in the preceding DL control resource block with which the UL transmission is associated.

Figure 9:
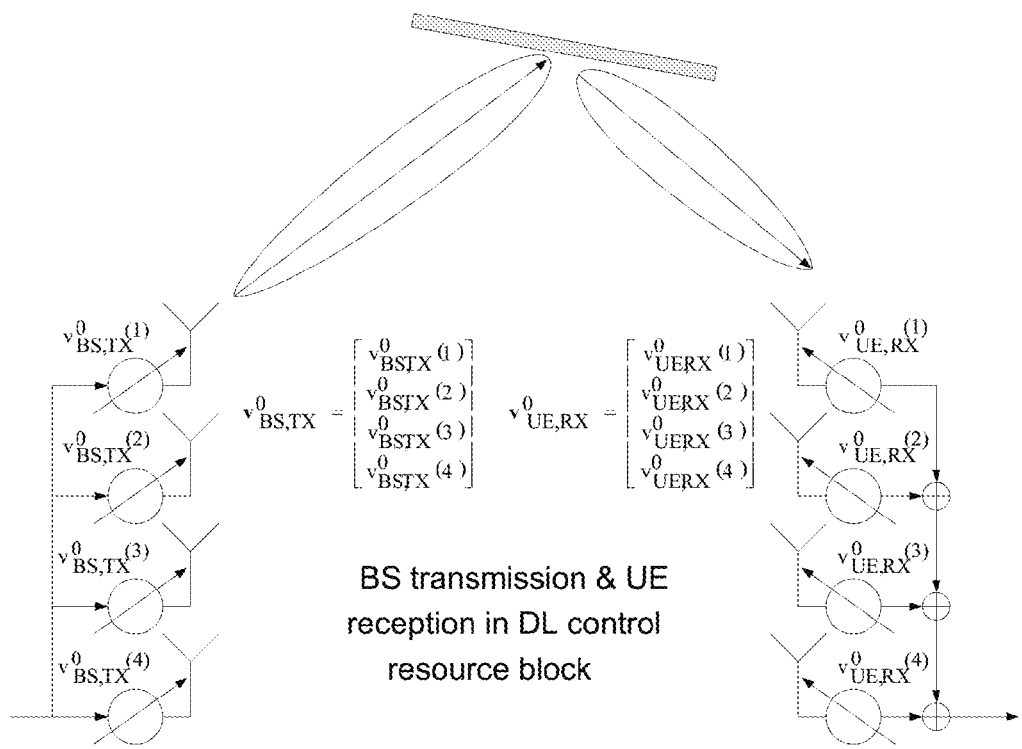
FIG. 9 illustrates BS transmission and UE reception in DL control resource blocks.
Figure 10:
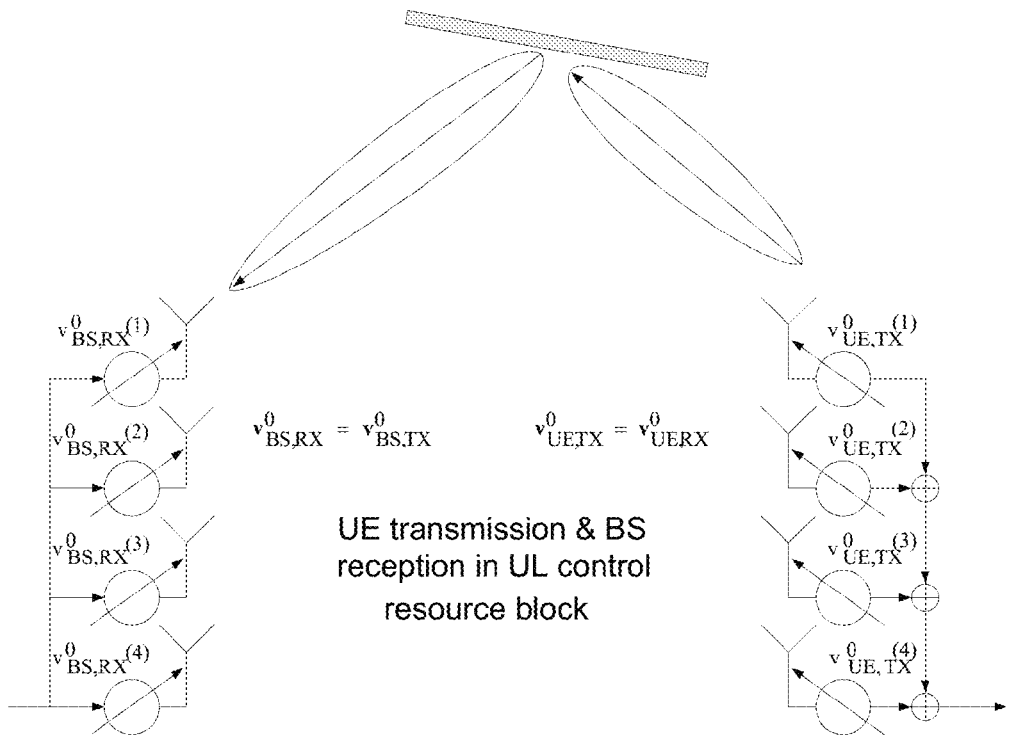
FIG. 10 illustrates UE transmission and BS reception in UL control resource blocks.

FIG. 9 illustrates BS transmission and UE reception in DL control resource blocks. FIG. 10 illustrates UE transmission and BS reception in UL control resource blocks. Under spatially reciprocal beamforming, the same beamformed antenna pattern is used for reception and transmission. As illustrated in FIG. 9, for downlink transmission with control beam CB0, the BS applies TX beamforming vector $V^0_{BS,TX}$ and the UE applies RX beamforming vector $V^0_{UE,RX}$ in DL control resource blocks. As illustrated in FIG. 10, for uplink transmission with CB0, the BS applies RX beamforming vector $V^0_{BS,RX}$ and the UE applies TX beamforming vector $V^0_{UE,TX}$ in UL control resource blocks. Under spatially reciprocal beamforming, the beamforming vectors of control beam CB0 for downlink and uplink are the same, e.g., $V^0_{BS,RX}=V^0_{BS,TX}$ for the base station and $V^0_{UE,TX}=V^0_{UE,RX}$ for the UE.

Figure 11:
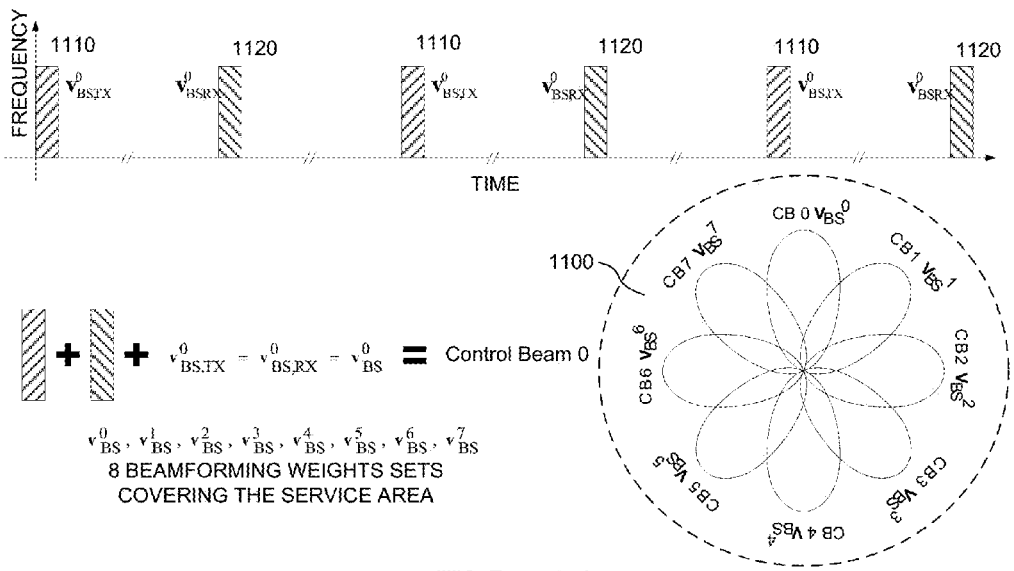
FIG. 11 illustrates control beams in a cell comprising DL and UL control resource blocks and their associated beamforming weights.

FIG. 11 illustrates control beams in a cell comprising DL and UL control resource blocks and their associated beamforming weights. The set of DL and UL control resource blocks and their associated beamforming weights set are collectively referred to as a Control Beam (CB) in a cell. Multiple sets of beamforming weights create radiation patterns covering the entire service area of the cell. One set of DL control resource blocks and one set of UL control resource blocks are associated with each of the beamforming weights set. Each cell has multiple control beams covering its entire service area. In the example of FIG. 11, control beam 0 (CB0) in cell 1100 comprises a set of DL control resource blocks 1110, a set of UL control resource blocks 1120, and a set of corresponding beamforming weights or beamforming vectors ($V^0_{BS,TX}=V^0_{BS,RX}=V^C_{BS}$). The base station allocates eight control beams from CB0 to CB7 for cell 1100. CB0 is associated with beamforming vectors $V^0_{BS}$, CB1 is associated with beamforming vectors $V^1_{BS}$, and so on so forth. The collection of the eight beamforming vectors $V^0_{BS}$ through $V^7_{BS}$ creates a radiation pattern covering the entire service area of the cell.

Figure 12:
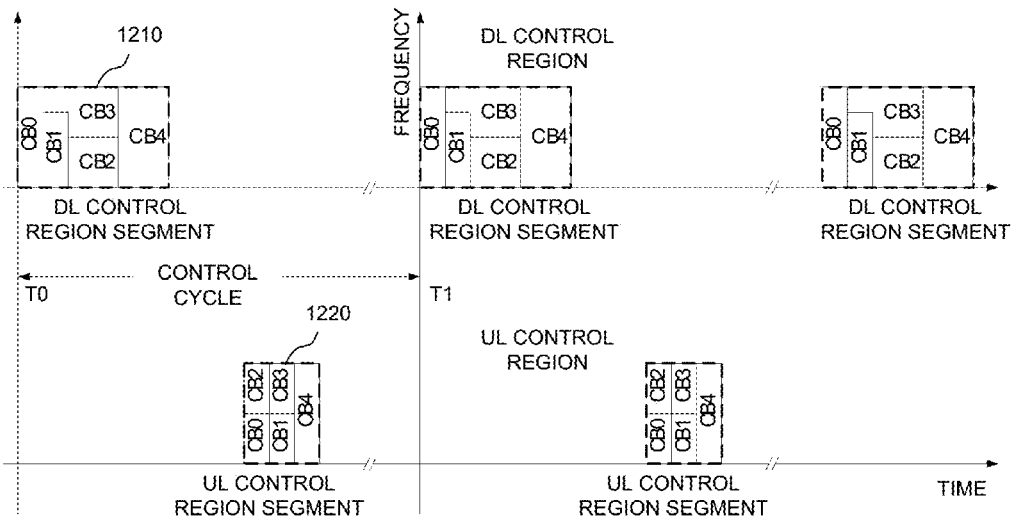
FIG. 12 illustrates control region, control region segment, and control cycle of a control beam.

FIG. 12 illustrates control region, control region segment, and control cycle of a control beam. The collection of all DL control resource blocks associated with all control beams in a cell is referred to as the DL control region of a cell. DL control region may further be divided into DL control region segments. A DL control region segment comprises DL control resource blocks associated with all or part of the control beams in a cell within a certain time period referred to as the control cycle of the cell. Similarly, the collection of all UL control resource blocks associated with all control beams in a cell is referred to as the UL control region of a cell. UL control region may further be divided into UL control region segments. A UL control region segment comprises UL control resource blocks associated with all or part of the control beams in a cell within the control cycle of the cell. There is one DL control segment and one corresponding UL control segment in a control cycle of a cell. The control cycle of the cell may be pre-configured and known to the UEs or dynamically configured and signaled to or blindly detected by the UEs. The control cycle may vary over time.

In the example of FIG. 12, the top half of the diagram depicts the DL control region having three DL control region segments. Each DL control region segment comprises DL control resource blocks for control beams CB0, CB1, CB2, CB3, and CB4. The bottom half of the diagram depicts the UL control region having two UL control region segments. Each UL control region segment comprises UL control resource blocks for control beams CB0, CB1, CB2, CB3, and CB4. A control cycle, e.g., from time T0 to T1, comprises one DL control region segment 1210 and one UL control region segment 1220.

Figure 13:
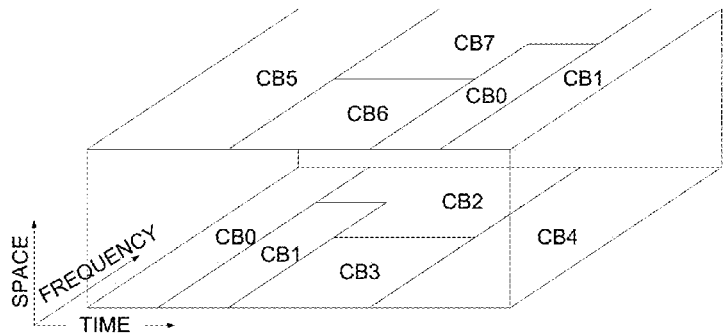
FIG. 13 illustrates control region segment and control resource block configuration.

FIG. 13 illustrates control region segment and control resource block configuration. In the example of FIG. 13, a control region segment comprises control resource blocks for eight control beams from CB0 to CB7. The control region segment can occupy any time-frequency resource blocks hardware allows for each CB. The different CBs can occupy the resource blocks in Time Division Multiplexed (TDM), in Frequency Division Multiplexed (FDM), in Code Division Multiplexed (CDM), in Spatial Division Multiplexed (SPD), or in any combination or mixture of the above multiplexing schemes.

Figure 14:
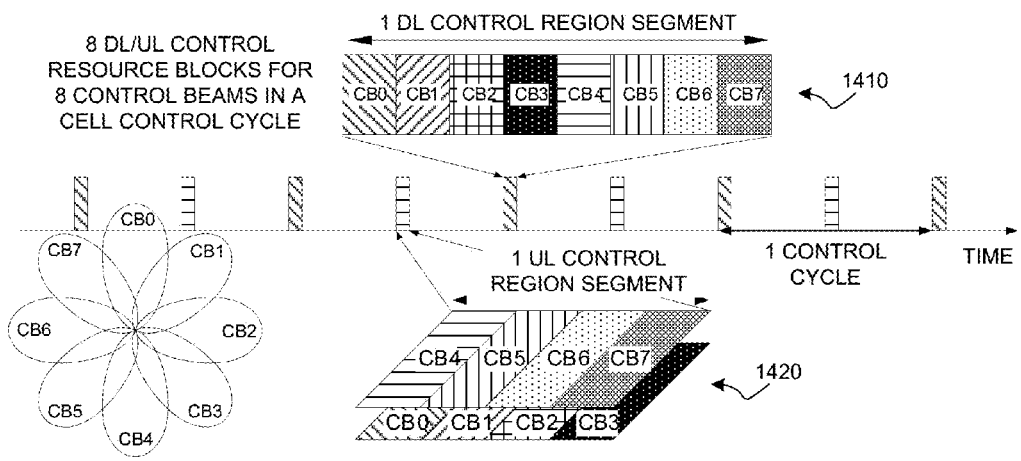
FIG. 14 illustrates a preferred embodiment of DL and UL control resource block configuration.

FIG. 14 illustrates a preferred embodiment of DL and UL control resource block configuration. The configurations for DL control region segment and UL control region segment need not to be the same. In the example of FIG. 14, there are eight DL/UL control resource blocks for eight control beams CB0 to CB7 in a control cycle of a cell. In one DL control region segment, the DL control resource blocks for different control beams are preferably Time Division Multiplexed (TDM) and contiguous in time. As depicted by block 1410, the DL control resource blocks for CB0 to CB7 are multiplexed in time domain. Each control beam transmits at maximum power to reach maximum range. On the other hand, in one UL control region segment, the UL control resource blocks for different control beams are preferably Spatial Division Multiplexed (SDM) in conjunction with other multiplexing schemes when a base station is equipped with multiple RF chains. As depicted by block 1420, the UL control resource blocks for CB0 to CB7 are multiplexed in spatial domain and in time domain. The base station equipped with multiple RF chains can receive multiple beams at the same time, and baseband digital processing can further mitigate inter-beam interference.

Figure 15:
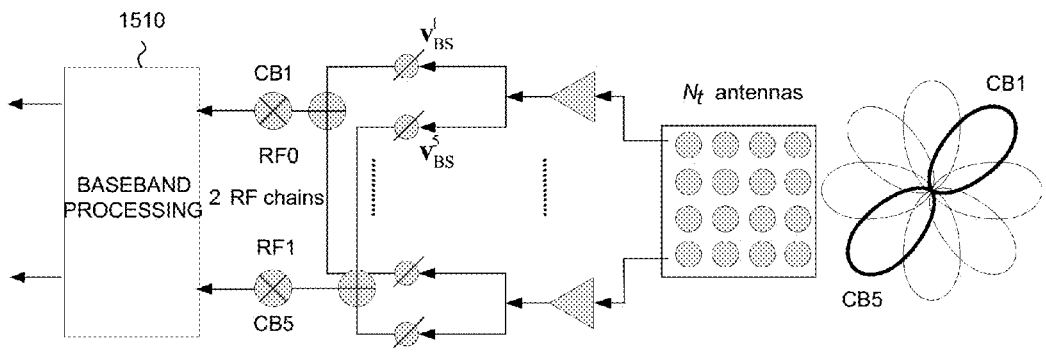
FIG. 15 illustrates an UL receiver having two RF chains for receiving two control beams simultaneously.

FIG. 15 illustrates an UL receiver having two RF chains for receiving two control beams simultaneously. In the example of FIG. 15, a base station is equipped with an RF receiver having two RF chains RF0 and RF1. In UL transmission, the base station receives CB1 and CB5 at the same time via RF0 and RF1, and then processes the received signal using a digital baseband processing module 1510 to mitigate inter-beam interference.

Figure 16A:
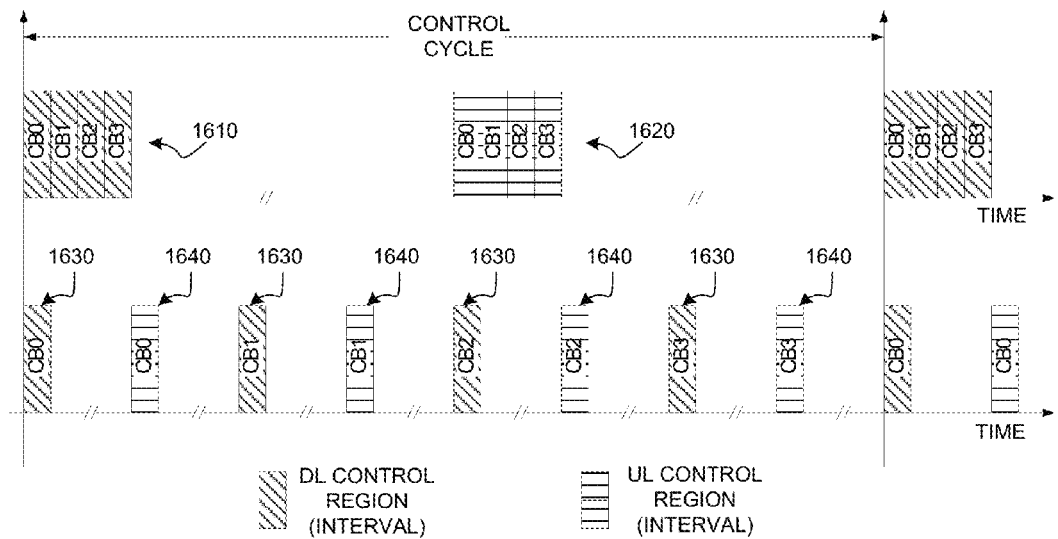
FIG. 16A illustrates embodiments with and without interleaved DL/UL control resource configuration.

FIG. 16A illustrates embodiments with and without interleaved DL/UL control resource configuration. In the top diagram of FIG. 16A, a control cycle comprises one DL control region segment 1610 and one corresponding UL control region segment 1620. DL control region segment 1610 comprises DL control resource blocks for four control beams CB0 to CB3. The DL control resource blocks for the four different control beams are TDMed and contiguous in time. Similarly, UL control region segment 1620 comprises UL control resource blocks for four control beams CB0 to CB3. The UL control resource blocks for the four different control beams are TDMed and contiguous in time. In the bottom diagram of FIG. 16A, a control cycle comprises one DL control region segment 1630 and one corresponding UL control region segment 1640. DL control region segment 1630 comprises DL control resource blocks for four control beams CB0 to CB3. UL control region segment 1640 comprises UL control resource blocks for four control beams CB0 to CB3. The DL control resource blocks and the UL control resource blocks for the four different control beams are TDMed but not contiguous in time. In a special case, the DL and UL control resource blocks are interleaved and alternate in time.

Figure 16B:
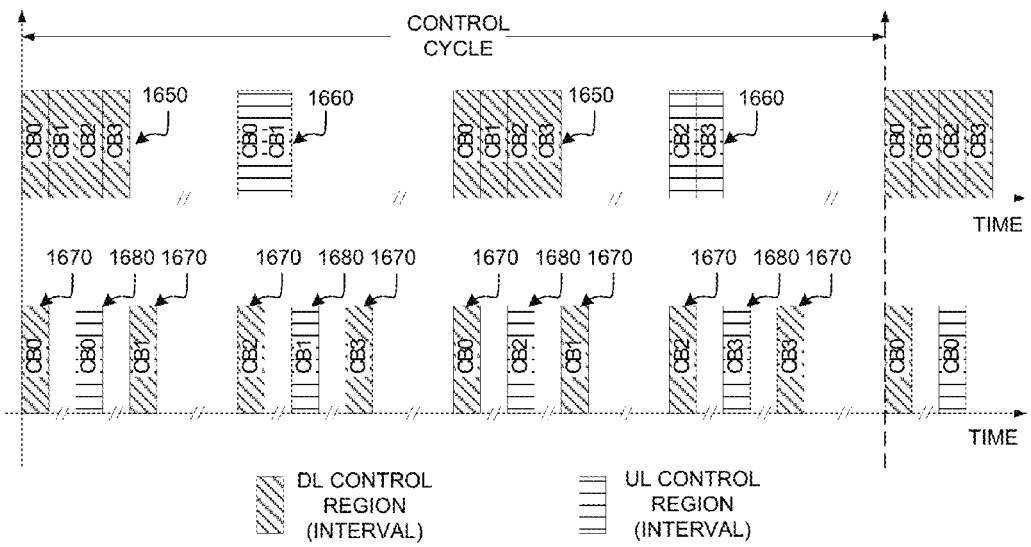
FIG. 16B illustrates one embodiment of control resource configuration with different DL/UL duty cycles.

FIG. 16B illustrates one embodiment of control resource configuration with different DL/UL duty cycles. In the top diagram of FIG. 16B, a control cycle comprises one DL control region segment 1650 and one corresponding UL control region segment 1660. DL control region segment 1650 comprises DL control resources for four control beams CB0 to CB3, which are TDMed and contiguous in time. Each DL control beam appear twice in the control cycle. UL control region segment 1660 comprises UL control resources for four control beams CB0 to CB3, which are TDMed and not contiguous in time. Each UL control beam appear once in the control cycle. As a result, the DL control beams have a shorter duty cycle than the UL control beams. In the bottom diagram of FIG. 16B, a control cycle comprises one DL control region segment 1670 and one corresponding UL control region segment 1680. DL control region segment 1670 comprises DL control resources for four control beams CB0 to CB3. UL control region segment 1680 comprises UL control resources for four control beams CB0 to CB3. The DL control resource blocks and the UL control resource blocks for the four different control beams are TDMed but not contiguous in time. In a special case, every two DL control resource blocks are interleaved by one UL control resource block. As a result, the DL control beams have a shorter duty cycle than the UL control beams.

Figure 17:
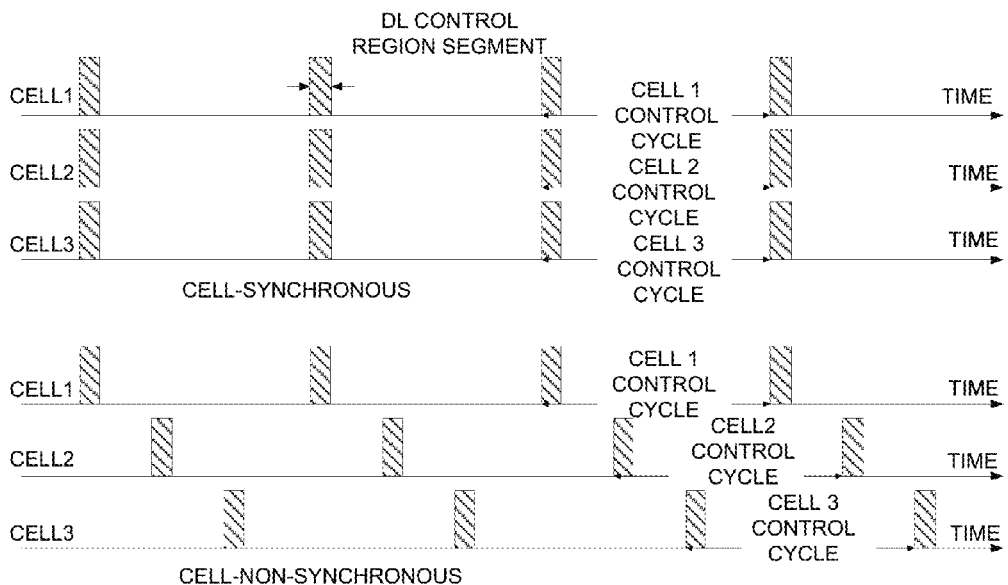
FIG. 17 illustrates embodiments of control cycles for different cells.

FIG. 17 illustrates embodiments of control cycles for different cells. In the top diagram of FIG. 17, the control cycles for different cells are the same, e.g., cell-synchronous. The DL control region segments for cell1, cell2, and cell3 are time-aligned. With cell-synchronous configuration, a UE is able to perform measurements for control beams from different cells during the same control region segment interval. In the bottom diagram of FIG. 17, the control cycles for different cells are different, e.g., cell-non-synchronous. The DL control region segments for cell1, cell2, and cell3 are not time-aligned. With cell-non-synchronous configuration, there is no inter-cell interference between control beams from different cells.

Figure 18:
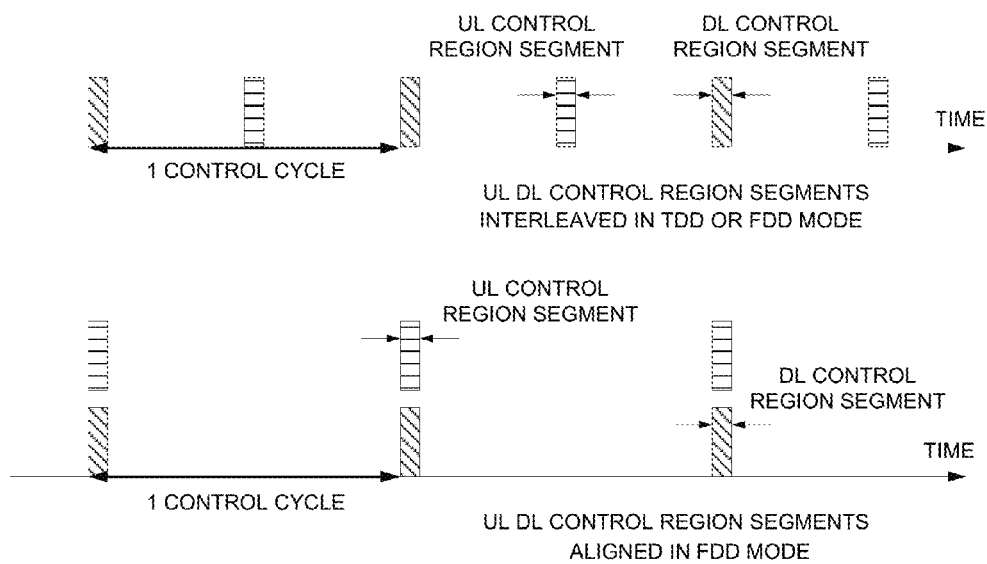
FIG. 18 illustrates embodiments of control cycles in TDD and FDD systems.

FIG. 18 illustrates embodiments of control cycles in TDD and FDD systems. In the top diagram of FIG. 18, the DL control region segments and the UL control region segments are interleaved in time in TDD or FDD mode. In the bottom diagram of FIG. 18, the DL control region segments and the UL control region segments may overlap or aligned in time in FDD mode.

Additional control resource blocks may be configured when the preconfigured resources for control beams are insufficient. For DL control beams, additional DL control resource blocks may be dynamically configured, pre-configured, or implicitly delivered from control beam identification. The addition DL control resource blocks may have a different frame format, e.g., pilot signal is not modulated because it does not need to carry beam ID. For UL control beams, additional UL control resource blocks may be dynamically configured, pre-configured, or implicitly delivered from control beam identification. The additional UL control resource blocks may be allocated for contention based or granted to a designated set of UEs. The additional UL control resource blocks may have a different frame format, e.g., pilot signal is not modulated because it does not need to carry UE ID.

Figure 19:
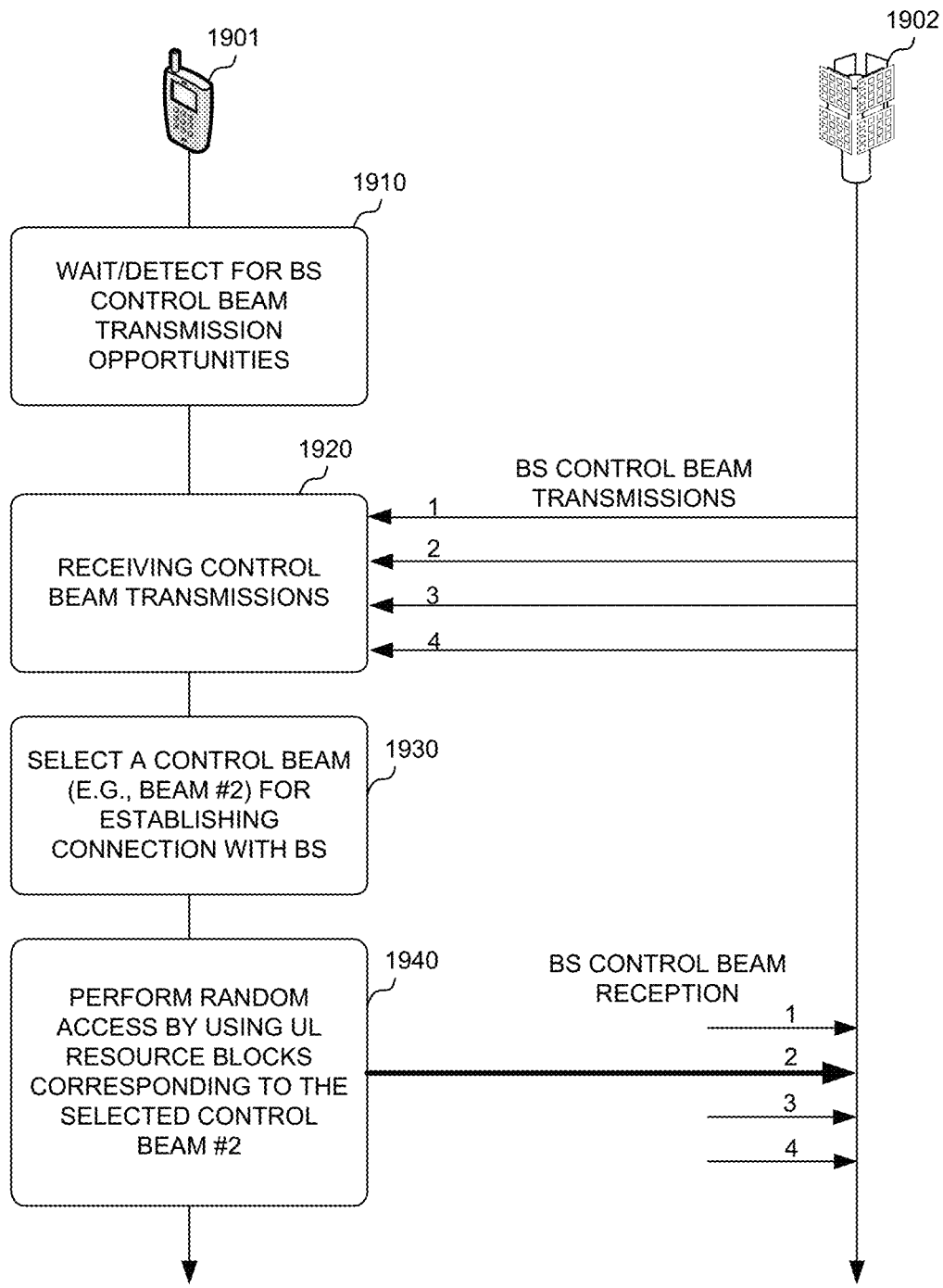
FIG. 19 illustrates a control signaling procedure between a UE and a BS in a beamforming system in accordance with one novel aspect.

FIG. 19 illustrates a control signaling procedure between a UE 1901 and a BS 1902 in a beamforming system in accordance with one novel aspect. In step 1910, UE 1901 tries to establish a connection with BS 1902. UE 1901 waits and detects BS control beam transmission, which are transmitted repeatedly and indefinitely. UE 1901 attempts to achieve time, frequency, and spatial synchronization with BS 1902, and acquiring required broadcast information for accessing the network. In step 1920, UE 1901 receives and detects control beam transmissions from BS 1902. For example, UE 1902 receives and detects four control beam transmissions of CB #1 to CB #4 from BS 1902. In step 1930, UE 1901 selects a control beam, e.g., control beam CB#2 for establishing connection with BS 1902. UE 1901 first performs time and frequency synchronization with BS 1902. Spatial synchronization is achieved after the UE selects the control beam for establishing the connection with the BS. UE 1901 then determines the UL control resources corresponding to the selected control beam CB #2. Moderate array gain is provided via the control beam, which partially compensates severe pathloss in mmWave channel and thus facilitates detection operation at UE. In step 1940, UE 1901 performs random access (RA) on the UL control resources corresponding to the selected control beam CB #2 for carrying essential information to BS 1902 that is required for connection establishment. Via the random access, the BS is aware of which control beam is preferred by the UE. The BS can reach the UE for completing the connection establishment procedure by using the selected control beam. Moderate array gain is provided via the control beam that facilitates BS reception of UE random access. The UL control resources include dedicated resource for random access and thus provide a better-protected UL channel.

Figure 20:
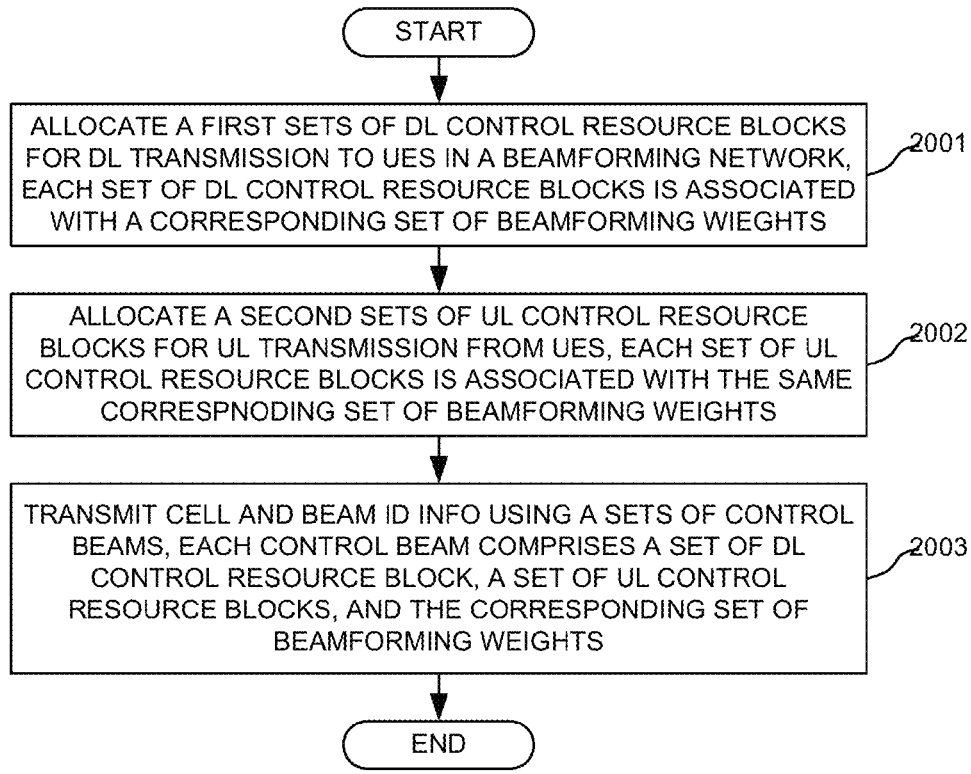
FIG. 20 is a flow chart of a method of control signaling from base station perspective in a beamforming system in accordance with one novel aspect.

FIG. 20 is a flow chart of a method of control signaling from base station perspective in a beamforming system in accordance with one novel aspect. In step 2001, a base station allocates a first sets of DL control resource blocks for DL transmission to a plurality of user equipments (UEs) in a beamforming network. Each set of DL control resource blocks is associated with a corresponding set of beamforming weights. In step 2002, the base station allocates a second sets of UL control resource blocks for UL transmission from the UEs. Each set of UL control resource blocks is associated with the same corresponding set of beamforming weights. In step 2003, the base station transmits cell and beam identification information using a set of control beams. Each control beam comprises a set of DL control resource block, a set of UL control resource block, and the corresponding set of beamforming weights. A collection of the beamforming weights of the set of control beams create a radiation pattern that covers an entire service area of a cell.

Figure 21:
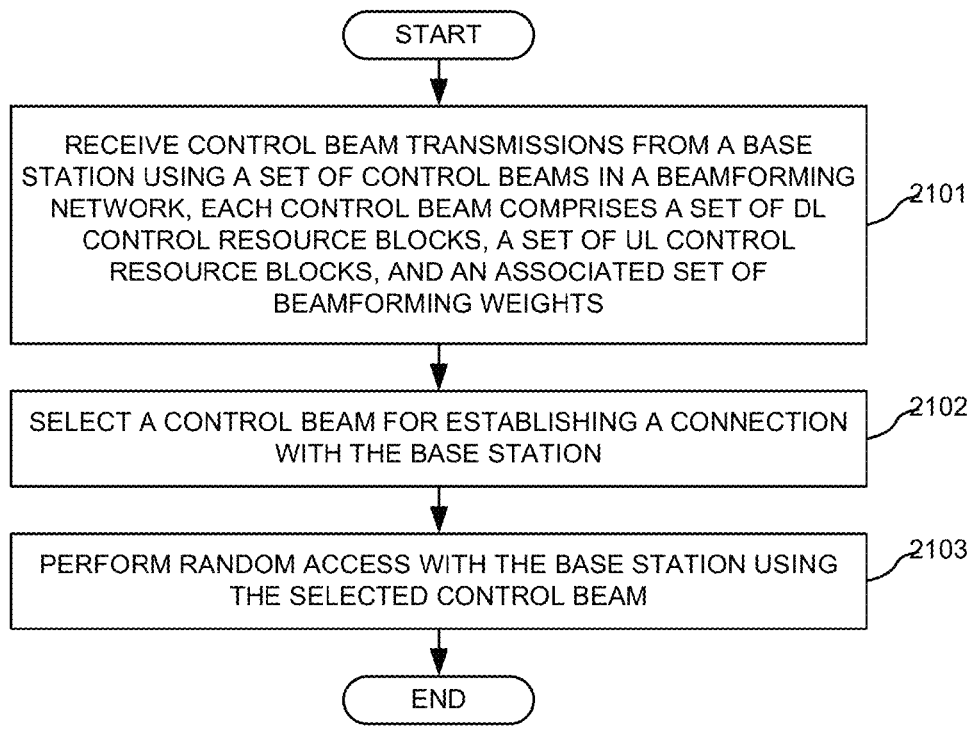
FIG. 21 is a flow chart of a method of control signaling from user equipment perspective in a beamforming system in accordance with one novel aspect.

FIG. 21 is a flow chart of a method of control signaling from user equipment perspective in a beamforming system in accordance with one novel aspect. In step 2101, a user equipment (UE) receives control beam transmission from a base station using a set of control beams in a beamforming network. Each control beam comprises a set of DL control resource blocks, a set of UL control resource blocks, and an associated set of beamforming weights. In step 2102, the UE selects a control beam for establishing a connection with the base station. In step 2103, the UE performs random access with the base station using the selected control beam.

Pilot Signals in the Control Beams

Figure 22:
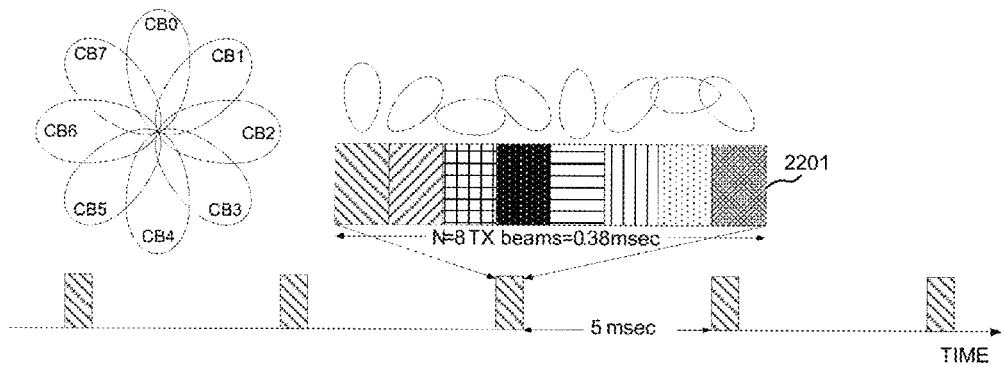
FIG. 22 illustrates one example of pilot signals in a control beam in a beamforming system in accordance with one novel aspect.

FIG. 22 illustrates one example of pilot signals in a control beam in a beamforming system in accordance with one novel aspect. As illustrated earlier with respect to FIG. 1, for control signaling purpose, a set of coarse TX/RX control beams are provisioned by the base station in the cellular system. The set of control beams may be periodically configured or occur indefinitely and repeatedly in order to be known to the UEs. The set of control beams covers the entire cell coverage area with moderate beamforming gain. Each control beam broadcasts a minimum amount of beam-specific information similar to Master Information Block or System Information Block (MIB or SIB) in LTE. Each beam may also carry UE-specific control and/or data traffic. Each control beam transmits a set of known pilot signals for the purpose of initial time-frequency synchronization, identification of the control beam that transmits the pilot signals, and measurement of radio channel quality for the control beam that transmits the pilot signals.

In the example of FIG. 22, a cell of a base station is covered by eight control beams CB0 to CB7. Each control beam comprises a set of downlink resource blocks, a set of uplink resource blocks, and a set of associated beamforming weights with moderate beamforming gain. Different control beams are time division multiplexed (TDM) in time domain. For example, a downlink subframe 2201 has eight DL control beams occupying a total of 0.38 msec. An uplink subframe (not shown) also has eight UL control beams occupying a total of 0.38 msec. The interval (a control cycle) between two DL/UL subframes is 5 msec. The set of control beams are lower-level control beams that provide low rate control signaling to facilitate high rate data communication on higher-level data beams. More specifically, a set of pilot signals for each of the control beams is transmitted in each of the periodically configured time-frequency resource blocks to facilitate the receiving devices to detect, identify, and synchronize to the control beams and perform the subsequent high rate data communication.

Figure 23:
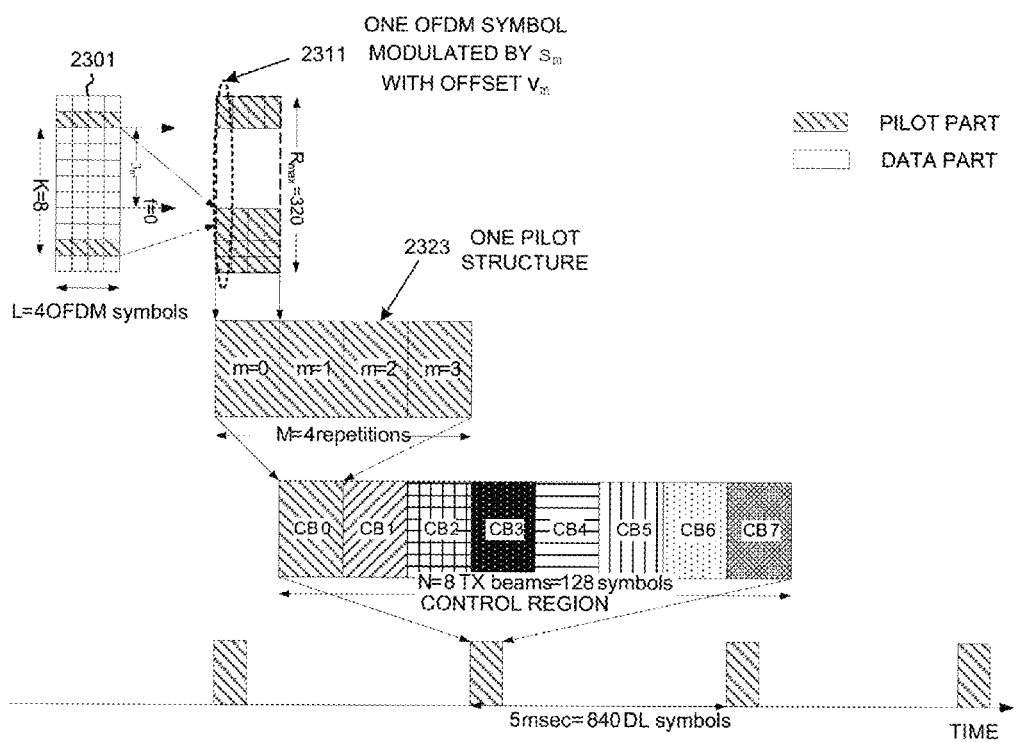
FIG. 23 illustrates a detailed example of pilot structures in control beams.

FIG. 23 illustrates a detailed example of pilot structures in control beams in a beamforming OFDM system. The interval (a control cycle) between two DL subframes in FIG. 23 is 5 msec, which contains 840 DL OFDM symbols. Each DL control region contains 128 OFDM symbols, and each control beam (e.g., CB0) within each control region contains 16 OFDM symbols. For CB0, each resource block (e.g., resource block 2301) allocated for CB0 contains L=4 OFDM symbols along time domain and a certain number of subcarriers along frequency domain depending on system bandwidth and configuration.

Within each OFDM symbol, pilot symbols are inserted once every K=8 subcarriers (or resource elements) for Rmax=320 times in one OFDM symbol (e.g., OFDM symbol 2311). The remaining subcarriers (or resource elements) are for data symbols. The pilot symbols have a power-boosting factor with respect to the data symbols. The pilot symbols have an offset $v_m$ with respect to the 0-th subcarrier. The pilot symbols span a sub-band or the entire band (K*Rmax≤$N_{ff}$). The R resource elements in OFDM symbol 2311 are modulated by a signature sequence $s_m[n]$ to identify the control beam (CB0). The same OFDM symbol is repeated for L times, e.g., for every OFDM symbols in resource block 2301, forming one pilot structure. Similar pilot structures are repeated for M times, indexed by repetition index m=0, 1 . . . M−1. For example, pilot structure 2323 have a repetition index of m=2. The M pilot structures (M repetitions) together form the pilot part of CB0.

The M pilot structures have a similar structure but with a different offset $v_m$ and/or a different signature sequence $s_m$. The actual value of offset $v_m$ and signature sequence $s_m$ are based on the repetition index m. Potentially, the different offsets $v_m$ resulting in a hopping pattern, while the different sequences $s_m$ are generated from circular delay-Doppler shifts of a base sequence. In one example, the different sequences $s_m$ belong to a set of Zadoff-Chu sequences with different delays and chirping slopes. As a result, the R resource elements in one OFDM symbol modulated by the signature sequence $s_m[n]$ can be used to identify a specific control beam.

Figure 24:
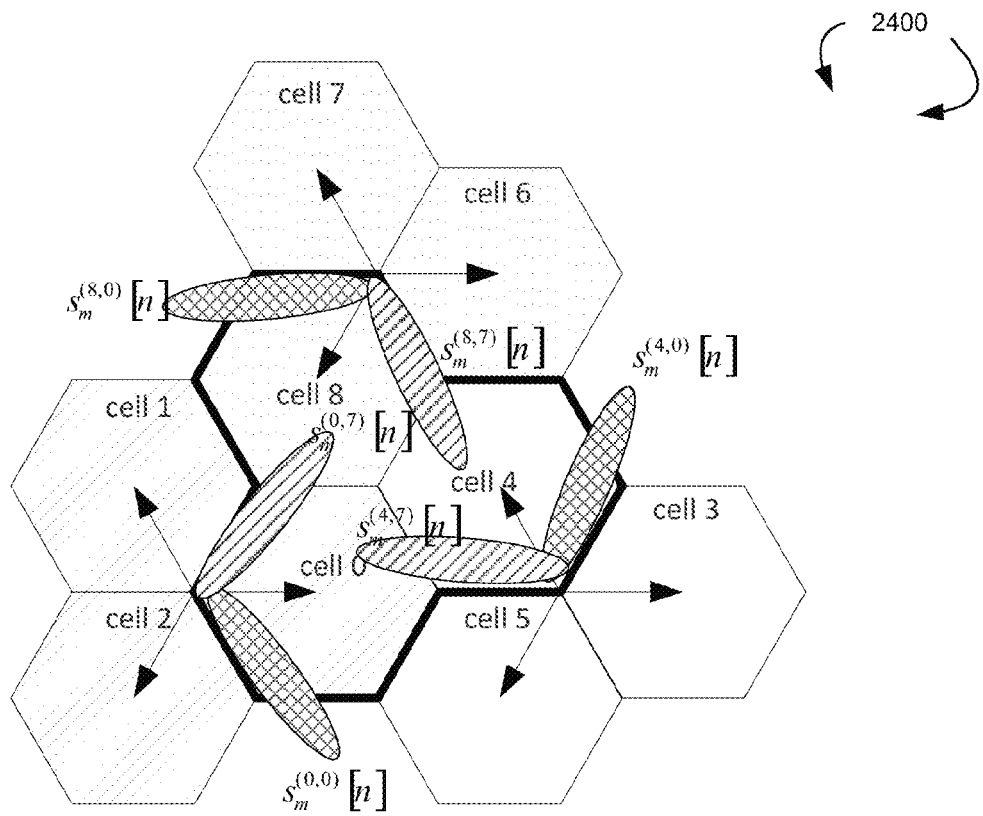
FIG. 24 illustrates control beam identification based on pilot signals.

FIG. 24 illustrates control beam identification based on pilot signals in a beamforming network 2400. Beamforming network 2400 comprises a plurality of cells. Each base station configures a set of control beams to create a radiation pattern covering an entire service area of a cell for pilot signal transmission. Each control beam of the cell is identified by the pilot symbols having a hopping pattern $v_m$ and a sequence $s_m[n]$. Specifically, for the j-th control beam of the i-th cell, there is a corresponding identifier pair $v_m(i,j)$ and $s_m(i,j)[n]$ with some variations.

In the example of FIG. 24, there are nine cells (cell 0 to cell 8), and each cell has eight control beams (CB0 to CB7). In one example, the same hopping pattern but different sequences are associated with different control beams of the same cell. In another example, the same sequence but different hopping patterns are associated with different control beams of the same cell. In yet another example, sequences for different control beams in the same cell belong to a set of sequences derived from the same base sequence. Note that the same identifier pair may be reused spatially.

Figure 25:
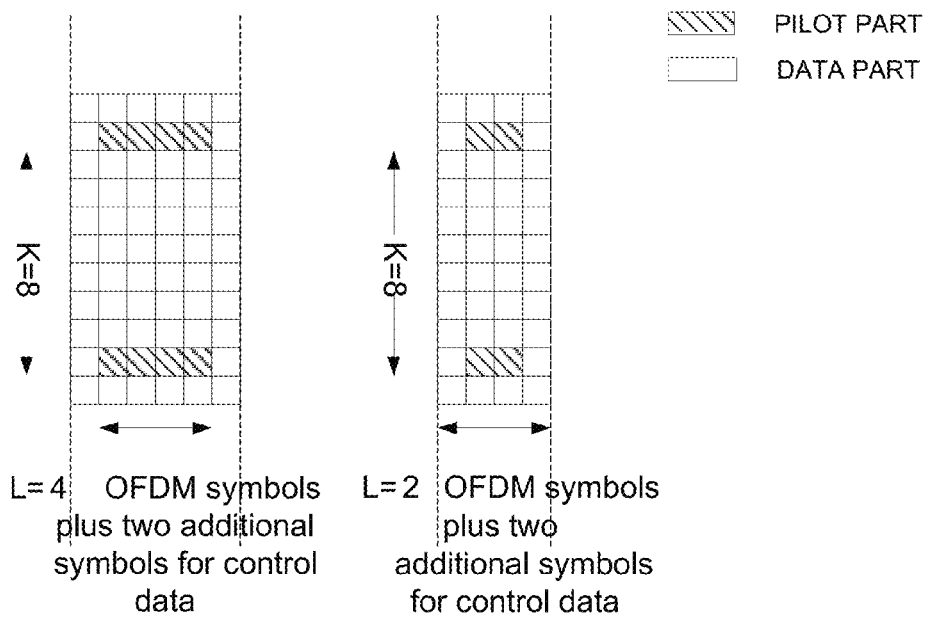
FIG. 25 illustrates variations of pilot structures with additional OFDM symbols.

FIG. 25 illustrates variations of pilot structures with additional OFDM symbols. As depicted by the left diagram in FIG. 25, each resource blocks allocated for a control beam contains six OFDM symbols along time domain. The left most and the right most OFDM symbols are allocated for data part, while part of the middle L=4 OFDM symbols are allocated for pilot part. Pilot symbols are inserted every K=8 subcarriers in each of the L=4 OFDM symbols and the same OFDM symbol is repeated for L=4 times. As depicted by the right diagram in FIG. 25, each resource blocks allocated for a control beam contains four OFDM symbols along time domain. The left most and the right most OFDM symbols are allocated for data part, while part of the middle L=2 OFDM symbols are allocated for pilot part. Pilot symbols are inserted every K=8 subcarriers in each of the L=2 OFDM symbols and the same OFDM symbol is repeated for L=2 times. In other words, L is configurable by the base station and additional OFDM symbols can be padded before and/or after the pilot symbols to carry additional data symbols.

Figure 26:
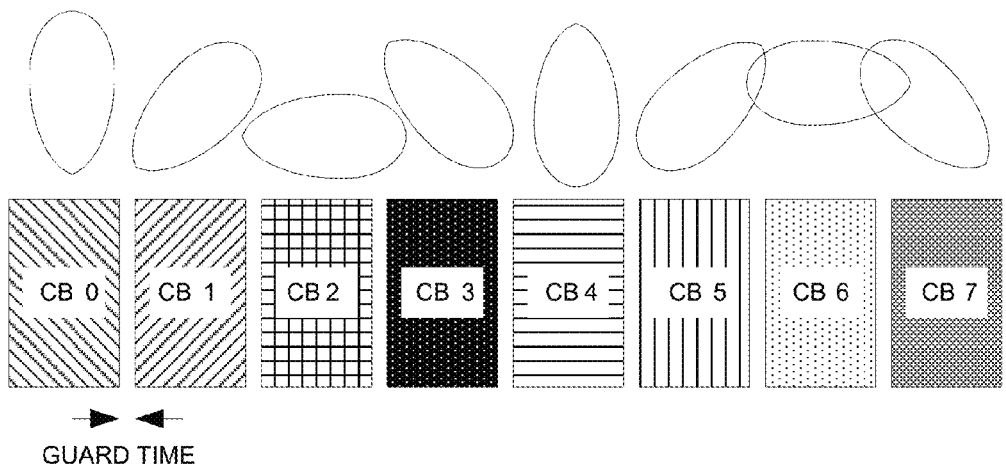
FIG. 26 illustrates variations of pilot structures with guard time.

FIG. 26 illustrates variations of pilot structures with guard time. As illustrated in FIG. 26, between switching from one control beam to another control beam, additional guard time can be inserted. For example, a guard interval is inserted between CB0 and CB1 to ensure that distinct transmissions for CB0 and CB1 do not interfere with one another.

Figure 27:
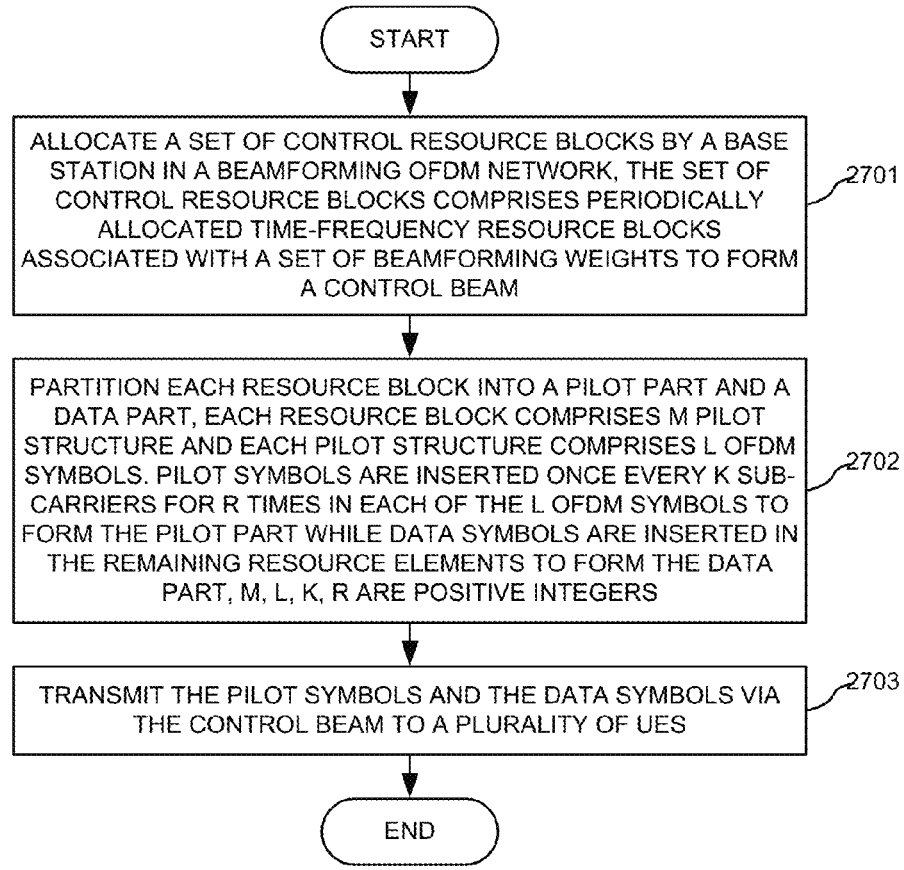
FIG. 27 is a flow chart of a method of allocating resources for pilot symbol transmission in a beamforming system in accordance with one novel aspect.

FIG. 27 is a flow chart of a method of allocating resources for pilot symbol transmission in a beamforming system in accordance with one novel aspect. In step 2701, a base station allocates a set of control resource blocks in a beamforming OFDM network. The set of control resource blocks comprises periodically allocated time-frequency resource blocks associated with a set of beamforming weights to form a control beam. In step 2702, the base station partitions each resource block into a pilot part and a data part. Each pilot part is divided into M pilot structures and each pilot structure comprises L OFDM symbols. Pilot symbols are inserted once every K subcarriers for R times in each of the L OFDM symbol to form the pilot part while data symbols are inserted in the remaining resource elements to form the data part. The variables M, L, K, and R are all positive integers. In step 2703, the base station transmits the pilot symbols and the data symbols via the control beam to a plurality of user equipments (UEs). The M pilot structures have a similar structure with a different offset $v_m$ and a different sequence $s_m$. Each control beam of a cell is identified by the pilot symbols having a hopping pattern based on $v_m$ and a signature sequence $s_m$. Specifically, for the j-th control beam of the i-th cell, there is a corresponding identifier pair $v_m(i,j)$ and $s_m(i,j)[n]$.

Variable Cyclic Prefix

As illustrated earlier with respect to FIG. 23, pilot symbols are inserted once every K subcarriers (or resource elements) for Rmax=320 times in one OFDM symbol of each pilot structure. In order to facilitate pilot detection for the receiving device, the pilot symbols have a power-boosting factor with respect to the data symbols. In addition, the pilot symbols are repeated for L times in each pilot structure. The L repetitions can be implemented in different ways.

Figure 28:
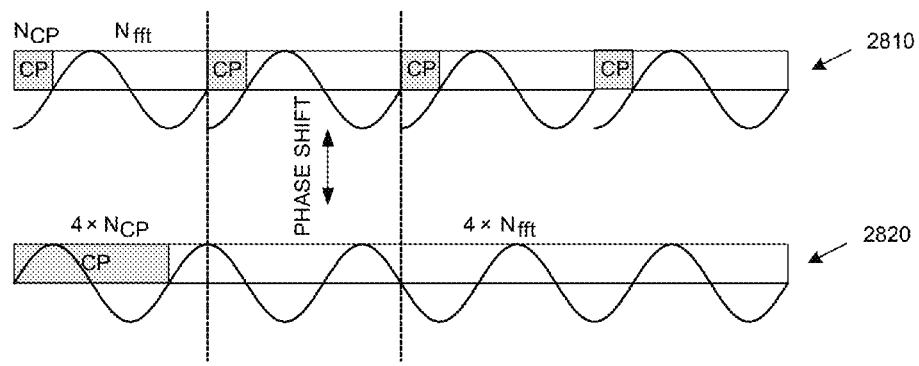
FIG. 28 illustrates different embodiments of OFDM symbols with repetitions in time domain.

FIG. 28 illustrates different embodiments of OFDM symbols with L repetitions in time domain. In the top diagram 2810 of FIG. 28, the L repetitions are implemented in a traditional way using L OFDM symbols. That is, the resource elements (once every K subcarriers) in one OFDM symbol are modulated by a signature sequence $s_m[n]$ of the pilot signal. The same OFDM symbol is repeated for L times forming one pilot structure. Diagram 2810 illustrates a time domain representation of the L=4 OFDM symbols after performing IFFT with a normal FFT size of $N_{fft}$ and each OFDM symbol has a normal CP length of Ncp. In one example, $N_{fft}$=1024, and the $N_{CP}$=128.

In the bottom diagram 2820 of FIG. 28, the L repetitions are implemented using one long OFDM symbol with longer FFT size CP length. That is, the resource elements (once every L*K subcarriers) in one long OFDM symbol are modulated by a signature sequence $s_m[n]$ of the pilot signal. Diagram 2820 illustrates a time domain representation of the long OFDM symbol after performing IFFT with a FFT size of $L*N_{fft}$ and the OFDM symbol has a CP length of L*Ncp. In one example, $L*N_{fft}$=4096, and $L*N_{CP}$=512. With long FFT size and long CP length, the same pilot symbols are repeated L times with phase continuity across the L repetitions in the long OFDM symbol. Note that if normal size FFT is performed on the original OFDM boundary, then phase shift rotation is needed on the pilot symbols to implement the bottom diagram 2820.

Figure 29:
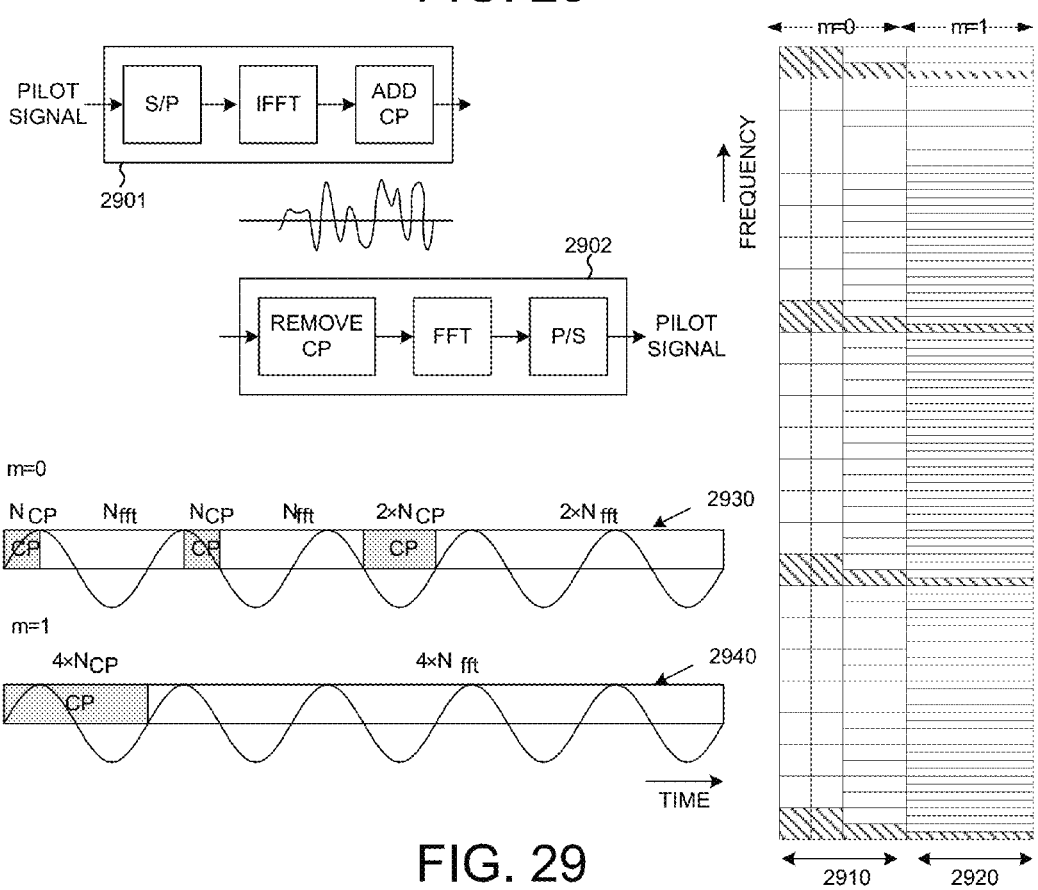
FIG. 29 illustrates pilot structures with variable cyclic prefix length and variable length FFT.

FIG. 29 illustrates pilot structures with variable cyclic prefix length and variable length FFT. At the transmitting side 2901, a pilot signal is first converted by a serial to parallel converter, pilot symbols are inserted to a resource block of a control beam and converted from frequency domain signal to time domain signal by applying IFFT, and then added with cyclic prefix before control beam transmission. At the receiving side 2902, the receiver operates on the received time domain signal by performing FFT to reconstruct the pilot structure. The cyclic prefix is first removed from the received signal, then converted from time domain signal back to frequency domain signal by applying FFT, and converted by a parallel to serial converter. Pilot symbols are extracted to recover the pilot signal.

Diagram 2910 of FIG. 29 is a frequency domain representation for pilot structure with index m=0, and diagram 2930 is a corresponding time domain representation of the OFDM symbols for pilot structure with index m=0. As shown in diagram 2910, pilot symbols are inserted once every K=8 subcarriers for the first OFDM symbol. The same OFDM symbol is then repeated for the second OFDM symbol. As shown in diagram 2930, the first two OFDM symbols are applied with FFT size of $N_{fft}$ with a CP length of $N_{CP}$. Starting from the next OFDM symbol in the same pilot structure m=0, pilot symbols are inserted once every K=2*8=16 subcarriers as depicted by 2910. The third OFDM symbol is applied with FFT size of $2*N_{fft}$ with a CP length of $2*N_{CP}$ as depicted by 2930. Similarly, diagram 2920 of FIG. 29 is a frequency domain representation for pilot structure with index m=1, and diagram 2940 is a corresponding time domain representation of the OFDM symbol for pilot structure with index m=0. As shown in diagram 2920, pilot symbols are inserted once every K=4*8=32 subcarriers for the OFDM symbol. As shown in diagram 2940, the OFDM symbol is applied with FFT size of $4*N_{fft}$ with a CP length of $4*N_{CP}$.

In beamforming networks, the delay spread is larger for wider beam because of more multi-paths in the channel and results in greater chance to pull in paths with longer delays. Some UEs may choose to use wider RX beam to search for control beams, and thus have longer delay spreads in the received signal. Some UEs may not even support beamforming. Longer delay spread needs longer CP length. With certain control beam resource blocks configured to support variable-length FFT with variable-length CP length in different pilot structures, UEs with larger delay spread can received their control data using longer FFT size and longer CP length. Note that the pilot symbols remain unchanged across the L repetitions. Therefore, pilot symbols are always processed at the largest FFT size (e.g., $L*N_{fft}$), or at its equivalent regular FFT size (e.g., $N_{fft}$) with appropriate phase rotations/shifts. Furthermore, constant power is maintained for the pilot symbols across the L repetitions.

Figure 30:
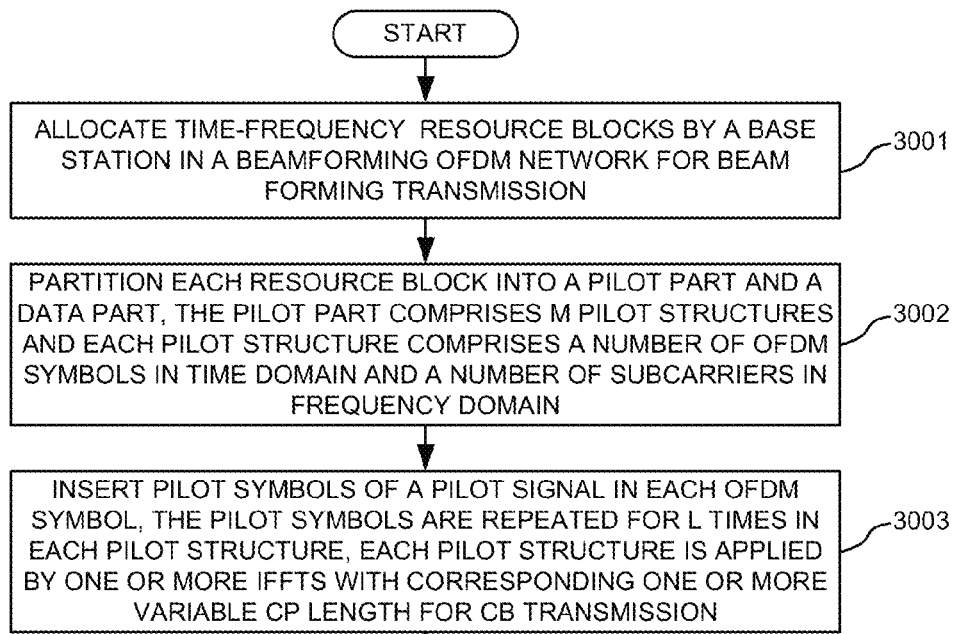
FIG. 30 is a flow chart of supporting variable CP length for pilot signal transmission in a beamforming network in accordance with one novel aspect.

FIG. 30 is a flow chart of supporting variable CP length for pilot signal transmission in a beamforming network in accordance with one novel aspect. In step 3001, a base station allocates time-frequency resource blocks in a beamforming OFDM network for control beam (CB) transmission. In step 3002, the base station partitions each resource block into a pilot part and a data part. The pilot part comprises M pilot structures and each pilot structure comprises a number of OFDM symbols in time domain and a number of subcarriers in frequency domain. In step 3003, the base station inserts pilot symbols of a pilot signal in each OFDM symbol in the pilot part. The pilot symbols are repeated for L times in each pilot structure, and each pilot structure is applied by one or more Inverse Fast Fourier Transfers (IFFTs) with corresponding one or more variable cyclic prefix (CP) lengths for CB transmission. M and L are positive integers. In one embodiment, a pilot structure comprises L OFDM symbols, the L repetitions are implemented by an IFFT of length $N_{fft}$ for L times, and each OFDM symbol has a cyclic prefix (CP) length of $N_{CP}$. In another embodiment, a pilot structure comprises one OFDM symbol, the L repetitions are implemented by an IFFT of length $(L \times N_{fft})$, and the OFDM symbol has a cyclic prefix (CP) length of $(L \times N_{CP})$.

Figure 31:
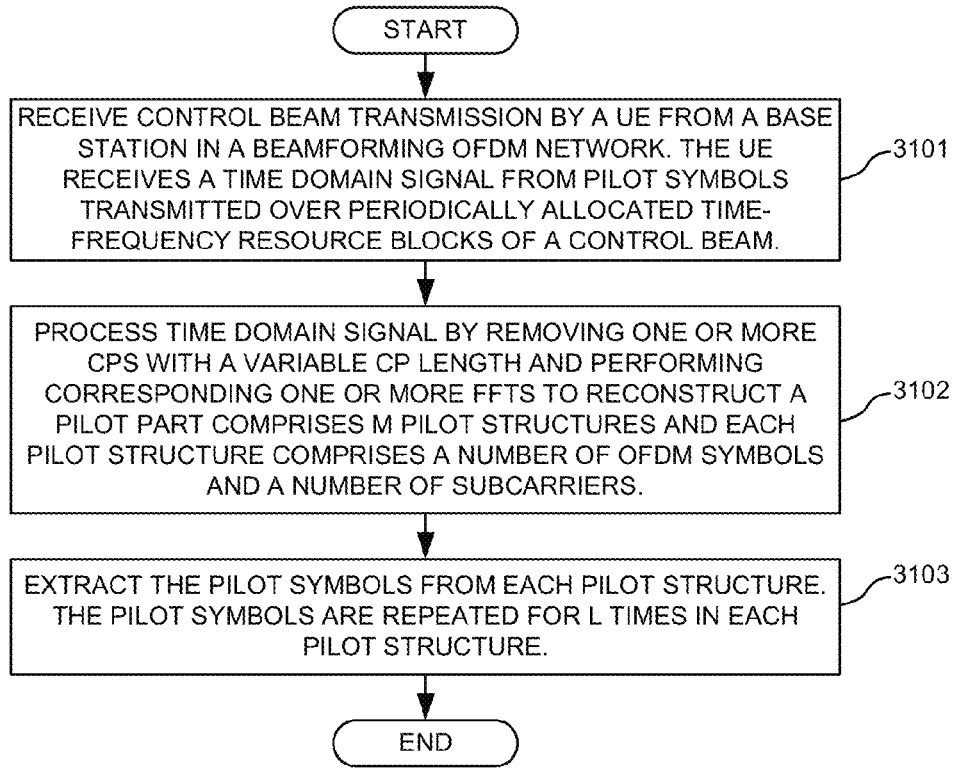
FIG. 31 is a flow chart of supporting variable CP length for pilot signal reception in a beamforming network in accordance with one novel aspect.

FIG. 31 is a flow chart of supporting variable CP length for pilot signal reception in a beamforming network in accordance with one novel aspect. In step 3101, a user equipment (UE) receives control beam transmission from a base station in a beamforming OFDM network. The UE receives a time domain signal from pilot symbols that are transmitted over periodically allocated time-frequency resource blocks of a control beam. In step 3102, the UE processes the time domain signal by removing one or more cyclic prefixes (CPs) with a variable CP length and performing corresponding one or more variable-length Fast Fourier Transfers (FFTs) to reconstruct a pilot part of a resource block, wherein the pilot part comprises M pilot structures and each pilot structure comprises a number of OFDM symbols in time domain and a number of subcarriers in frequency domain. In step 3103, the UE extracts the pilot symbols from each pilot structure. The pilot symbols are repeated for L times in each pilot structure, and M and L are positive integers. In one embodiment, a pilot structure comprises L OFDM symbols, the UE extracts the L repetitions by performing an IFFT of length $N_{fft}$ for L times, and each OFDM symbol has a cyclic prefix (CP) length of $N_{CP}$. In another embodiment, a pilot structure comprises one OFDM symbol, the UE extracts the L repetitions by performing an IFFT of length $(L \times N_{fft})$, and the OFDM symbol has a cyclic prefix (CP) length of $(L \times N_{CP})$.

Detection Procedure

Figure 32:
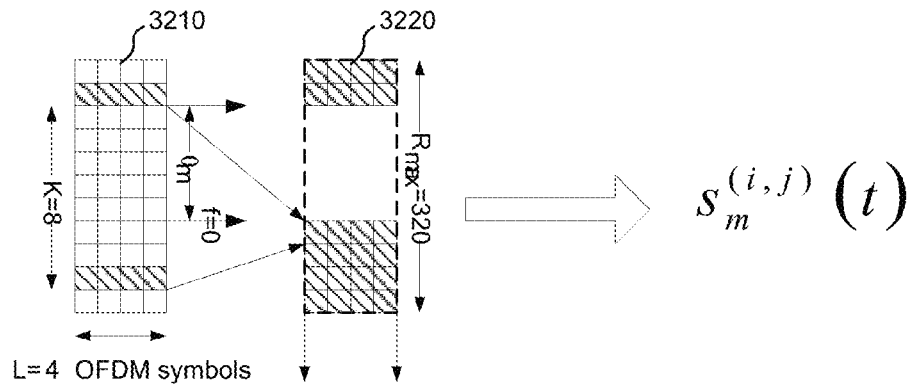
FIG. 32 illustrates a three-stage pilot signal detection procedure in accordance with one novel aspect.
Figure 32:
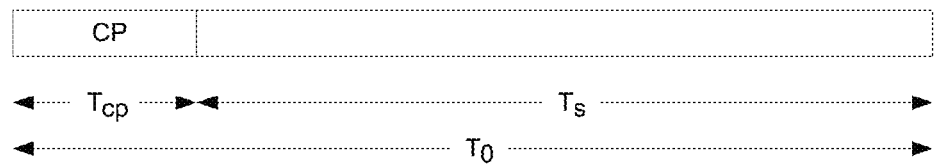
Figure 32:
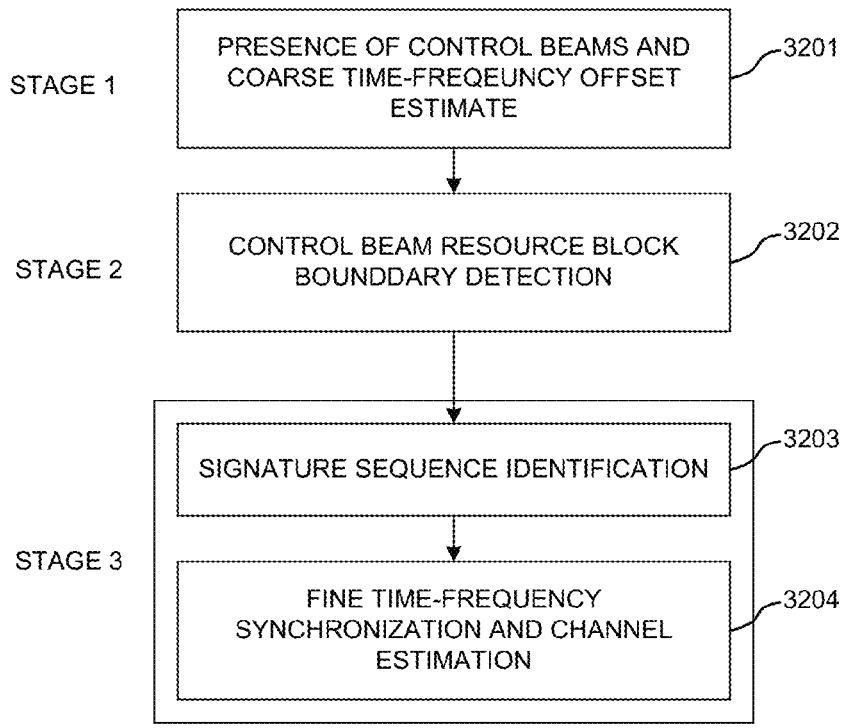

FIG. 32 illustrates a three-stage pilot signal detection procedure in accordance with one novel aspect. As illustrated earlier with respect to FIG. 23, pilot signals are transmitted via control beams in a cell using periodically allocated radio resource blocks. For DL pilot transmission, a base station allocates radio resource blocks (e.g., resource block 3210) and insert pilot symbols onto each pilot structure (e.g., pilot structure 3220). Within each OFDM symbol, pilot symbols are inserted once every K=8 subcarriers (or resource elements) for Rmax=320 times in one OFDM symbol. The pilot symbols have a power-boosting factor with respect to the data symbols. The pilot symbols have an offset $v_m$ with respect to the 0-th subcarrier. The pilot symbols span a sub-band or the entire band (K×Rmax≤$N_{fft}$). The R resource elements in each OFDM symbol are modulated by a signature sequence $s_m[n]$ to identify a control beam. The same OFDM symbol is repeated for L times, e.g., for every OFDM symbols in the resource block, forming one pilot structure. Similar pilot structures are repeated for M times, indexed by repetition index m=0, 1 . . . M−1.

The pilot signal for (cell i, control beam CB j) can be represented by:

$$p^{(i,j)}(t) = \sum_{m=0}^{M-1} s_m^{(i,j)}(t - mLT_0)e^{j2\pi v_m^{(i,j)} f_s(t-mLT_0)}$$

Where
- $s_m^{(i,j)}(t)$ is the time domain equivalent of the pilot signal for the j-th control beam of the i-th cell in the m-th repetition.
- L is the number of OFDM symbols in each pilot structure.
- m=0 . . . M−1 is the repetition index of each pilot structure.
- $v_m^{(i,j)}$ is the offset with respect to the 0-th subcarrier.
- $T_0$ is the regular OFDM symbol length (Ts) plus the regular CP length $T_{CP}$.

The received signal at the UE through delay-Doppler channel can be represented by:

$$r(t) = \sum_{i,j} \int p^{(i,j)}(t-\tau)e^{j2\pi vt} \cdot h^{(i,j)}(\tau, v)d\tau dv$$

Where
- $p^{(i,j)}$ is the pilot signal for the j-th control beam in the i-th cell.
- $h^{(i,j)}$ is the channel response for the j-th control beam in the i-th cell.

Based on the received signal r(t) from the control beam transmission, the receiving device (UE) needs to detect the presence of the pilot signal, e.g., identify the (cell, CB) ID and achieve time-frequency synchronization based on r(t). An exemplary three-stage pilot detection approach with reduced complexity is proposed. In stage-1 detection (step 3201), the UE detects the presence of control beams and performs coarse time-frequency offset estimation. In stage-2 detection (step 3202), the UE detects control beam resource boundaries. In stage-3 detection, the UE first performs signature sequence correlation and beam identification (step 3203), and then performs fine time-frequency synchronization and channel estimation (step 3204).

Figure 33:
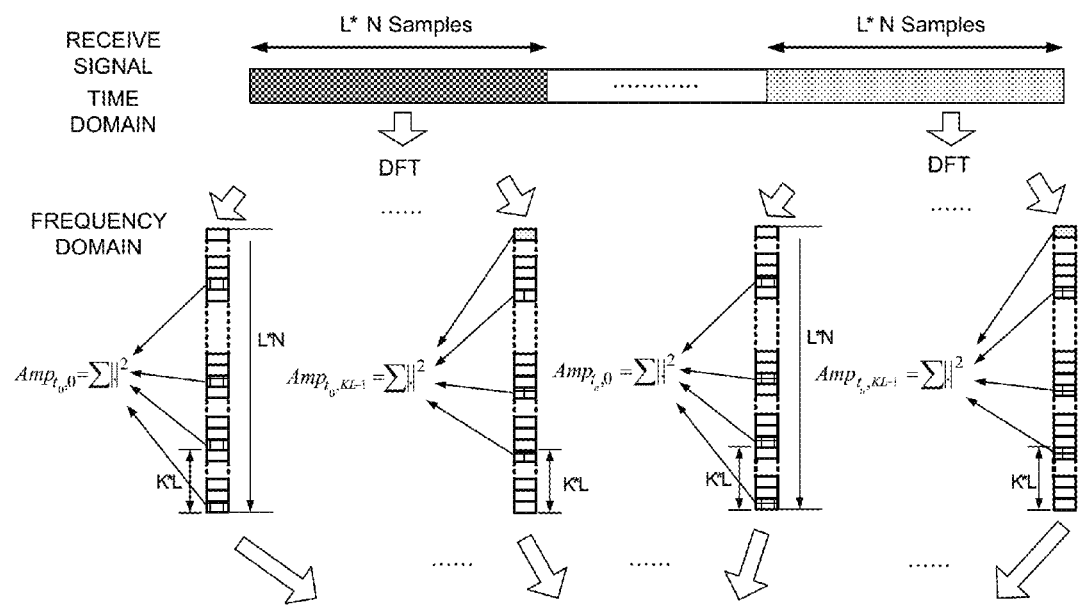
FIG. 33 illustrates a stage-1 control beam detection and coarse time-frequency estimation.

FIG. 33 illustrates a stage-1 control beam detection and coarse time-frequency estimation. A stage-1 detection detects presence of any control beam and its coarse resource block boundary and estimates the coarse time and carrier frequency offset. The detector calculates the sliding DFT of the extended OFDM symbols (the sliding windows may or may not overlap). Energy is summed over sub-carriers in which pilot symbols are inserted for each hypothesized frequency offset.

As illustrated in FIG. 33, UE receives a time-domain signal, which is carried by L*N samples in each pilot structure. The received time-domain signal is then converted to a frequency domain signal via Discrete Fourier Transfer (DFT). At each time instance t, potential pilot symbols are extracted once every K*L subcarriers (e.g., resource elements or tones) from a total of L*N subcarriers with an offset i. The receiver applies a sliding DFT plus combining algorithm in detecting the presence of any control beam and pilot symbols based on energy detection. In other words, the amplitude (energy) of the potential pilot tones are summed up for time instance t and offset i, and the receiver chooses the best (t,i) such that the amplitude reaches the maximum. More specifically, at time instance t and offset i=0 . . . (KL−1), the amplitude summation of pilot tones can be represented by:

$$Amp_{t_0,0} = \Sigma|\bullet|^2, Amp_{t_0,KL-1} = \Sigma|\bullet|^2 \text{ (for time } t0)$$

$$Amp_{t_n,0} = \Sigma|\bullet|^2, Amp_{t_n,KL-1} = \Sigma|\bullet|^2 \text{ (for time } tn)$$

Once the time and frequency index (t,i) is chosen, then the receiver determines that the coarse central frequency CFO=i*(1/KL), and the coarse OFDM boundary is at time t. Note that if the pilot tones have a power boosting as compared to data tones, the energy detection method may be more accurate.

Figure 34:
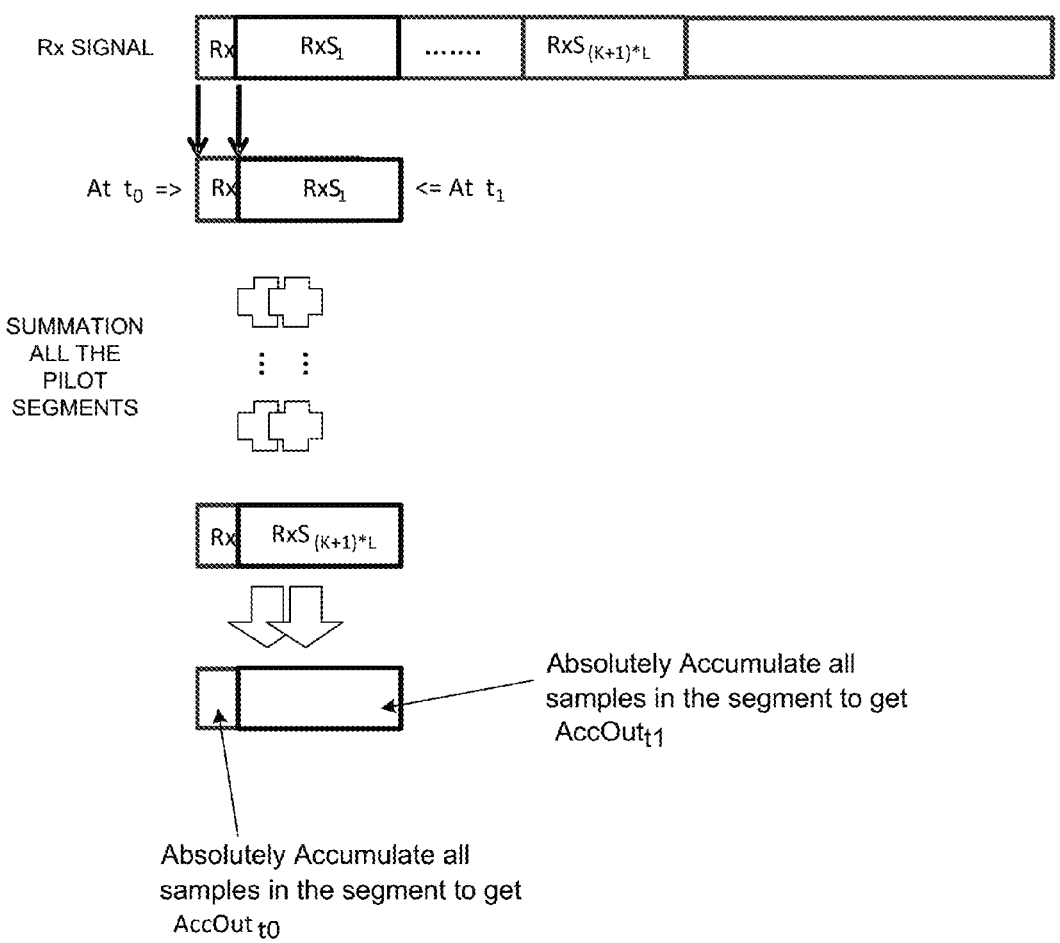
FIG. 34 illustrates a stage-2 control beam reference block boundary detection.

FIG. 34 illustrates a stage-2 control beam reference block boundary detection. A Stage-2 detector detects the coarse boundary (up to a window of uncertainty) of the control beam resource block boundary detected in stage-1 after the correction of frequency offset estimated in stage-1. Stage-2 detection is similar to stage-1 with the uncertainty in frequency offset removed, potentially longer extended OFDM symbols, and finer sliding window resolution. During the stage-2 energy detection, the presence of more control beams and their finer time-frequency synchronization can be achieved. The receiver applies a simple sliding DFT with energy detection of coherently accumulated pilot symbols after coarse CFO correction. The receiver is then able to determine a small fraction of OFDM symbol and sub-carrier for finer time-frequency synchronization.

When the pilot symbols are inserted every K sub-carriers in an OFDM symbols, the corresponding time domain signal will be K repetitions of a certain length ($N_{fft}/K$) sequence related to the complex values of the pilot symbols. Each one of those repetitions is a pilot segment. In the example of FIG. 34, the cyclic prefix is of length $N_{fft}/K$. Therefore, there are K+1 pilot segments in each OFDM symbol including its cyclic prefix. Because there are L repetitions in a pilot structure, there are a total of (K+1)*L pilot segments. At each time instance, all samples of the pilot segments are summed up to output an absolute accumulation (energy), e.g., AccOutt0 for time instance t0, and AccOutt1 for time instance t1, and so on so forth. For example, at time t1, the accumulation of all samples of the pilot segment can be represented by $AccOutt1=RxS_1+ \ldots +RxS_{(K+1)*L}$. The receiver then choose the time instance with the maximum accumulation for time domain synchronization. The L times repetition raises detection metric for pilot symbols by $10*\log_{10}(L)$ dB. Some control data symbols may also be repeated L times to yield sufficient SNR level for cell edge UEs, and the base station can avoid false alarm by limiting such resource mapping or distributing such resource mapping randomly. Pilot power boosting with respect to data symbols further improves detection performance.

Figure 35:
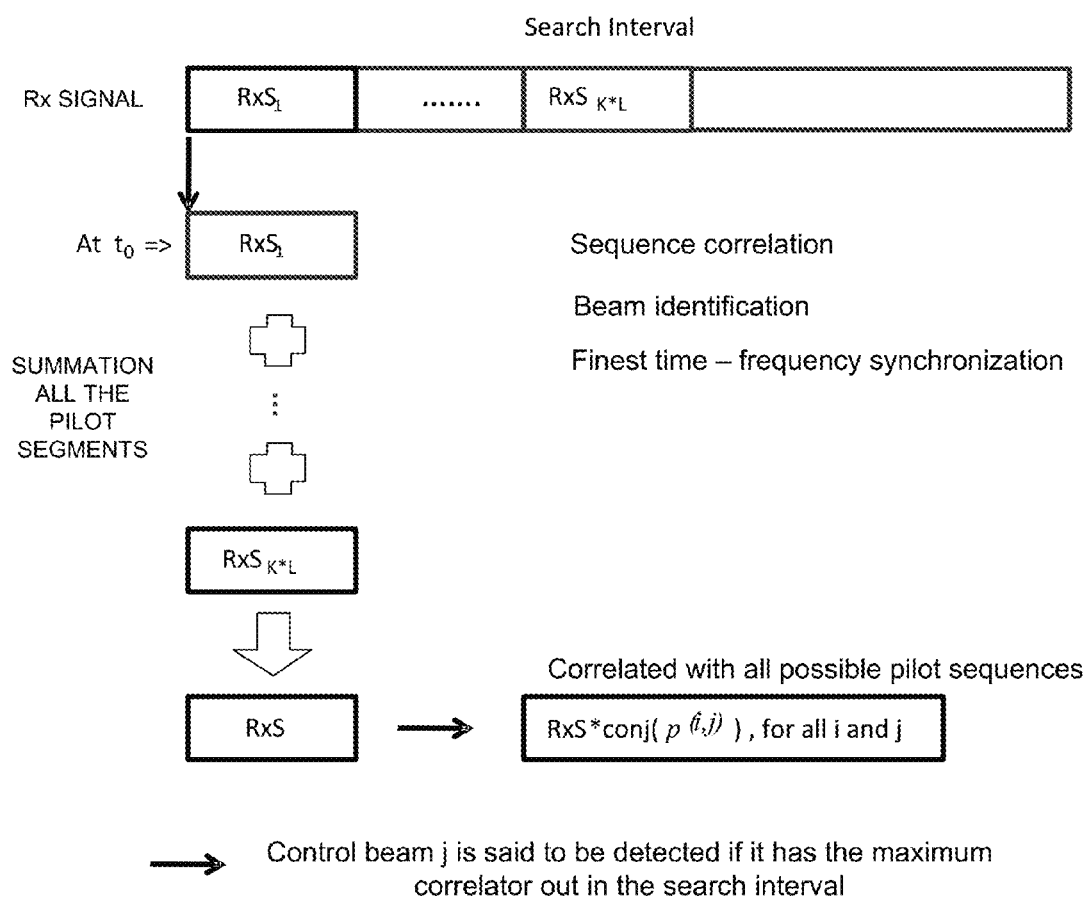
FIG. 35 illustrates a stage-3 sequence correlation and beam identification and fine time-frequency synchronization.

FIG. 35 illustrates a stage-3 sequence correlation and beam identification and finest time-frequency synchronization. From the outcome of the stage-2 detection, a search interval is determined, which is in the order of the cyclic prefix length. During a search interval, all the pilot segments are summed up by the receiver: $RxS=RxS_1+ \ldots +RxS_{(K+1)*L}$. The receiver then correlates the received signal RxS with all possible pilot sequences p(i,j) for all i and j. Control beam j in cell i is detected if it has the maximum correlation out in the search interval. Finest time and frequency synchronization is then performed. For example, once the strongest sequence and its associated control beam are detected, the stage-3 process in FIG. 35 can be performed for that particular sequence over finer hypotheses of the time and frequency offset interval to achieve the finest time and frequency synchronization.

Figure 36:
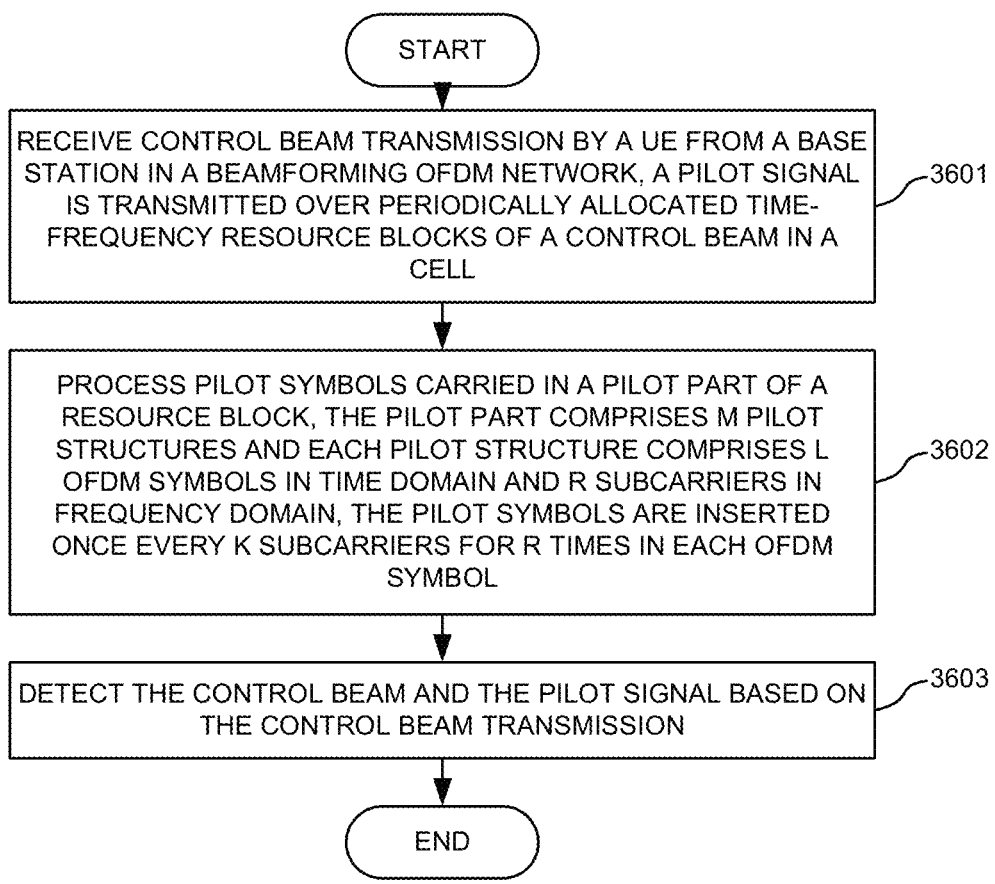
FIG. 36 is a flow chart of a method of pilot signal detection based on control beam transmission in a beamforming network in accordance with one novel aspect.

FIG. 36 is a flow chart of a method of pilot signal detection based on control beam transmission in a beam-forming network in accordance with one novel aspect. In step 3601, a user equipment (UE) receives control beam transmissions from a base station in a beamforming OFDM network. A pilot signal is transmitted over periodically allocated time-frequency resource blocks of a control beam in a cell. In step 3602, the UE processes pilot symbols carried in a pilot part of a resource block, the pilot part comprises M pilot structures and each pilot structure comprises L OFDM symbols in time domain and R subcarriers in frequency domain. The pilot symbols are inserted once every K subcarriers for R times in each OFDM symbol, and M, L, R, and K are positive integers. In step 3603, the UE detects the control beam and the pilot signal based on the control beam transmission.

In one embodiment, a three-stage pilot detection procedure is performed. In stage-1, the UE detects an existence of the control beam by performing a sliding Discrete Fourier Transform (DFT) and thereby estimating a coarse time-frequency offset. It involves energy detection by selecting a time instance and a frequency offset to achieve a maximum combined energy. In stage-2, the UE detects a time-frequency resource block boundary of the control beam. It involves performing a sliding DFT with energy detection of accumulated pilot symbols of a fraction of OFDM symbols and sub-carriers. In stage-3, the UE detects the pilot signal and identifying the control beam and performing fine time-frequency synchronization and channel estimation. It involves sequence correlation with all possible pilot sequences. The detected control beam has a maximum correlation during a search interval determined by the stage-2 detection.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method comprising:
  allocating a set of control resource blocks by a resource allocation circuit of a base station in a beamforming OFDM (Orthogonal Frequency-Division Multiplexing) network, wherein the set of control resource blocks comprises periodically allocated time-frequency resource blocks associated with a set of beamforming weights to form a control beam;

partitioning each resource block into a pilot part and a data part by a pilot allocation circuit of the base station, wherein each resource block comprises M pilot structures and each pilot structure comprises L OFDM symbols, wherein pilot symbols are inserted once every K subcarriers for R times in each of the L OFDM symbols to form the pilot part while data symbols are inserted in the remaining resource elements to form the data part, and wherein M, L, K, and R are positive integers; and transmitting the pilot symbols and the data symbols via the control beam to a plurality of user equipments (UEs) by a radio frequency transmitter of the base station, wherein each pilot symbol in each of the $m^{th}$ pilot structures has a signature sequence $s_m$ with an offset $v_m$, wherein each $s_m$ is generated from a base sequence applied with a circular shift value of $v_m$, and wherein m is a repetition index for the M pilot structures that are associated with the same control beam.

2. The method of claim 1, wherein the pilot symbols have a power-boosting factor with respect to the data symbols.

3. The method of claim 1, wherein the pilot symbols have the offset $v_m$ with respect to the 0-th subcarrier.

4. The method of claim 1, wherein the R resource elements carrying the inserted pilot symbols in an OFDM symbol are modulated by $s_m$ to identify the control beam.

5. The method of claim 1, wherein the different offsets $v_m$ resulting in a hopping pattern.

6. The method of claim 1, wherein the different sequences $s_m$ are generated from circular delay-Doppler shifts of the base sequence.

7. The method of claim 1, wherein the different sequences $s_m$ belong to a set of Zadoff-Chu sequences with different delays and chirping slopes.

8. The method of claim 1, wherein the base station configures a set of control beams to create a radiation pattern covering an entire service area of a cell.

9. The method of claim 8, wherein each control beam of the cell is identified by the pilot symbols having a hopping pattern and a sequence.

10. The method of claim 9, wherein the same hopping pattern and different sequences are associated with different control beams of the same cell.

11. The method of claim 9, wherein different hopping patterns and the same sequence are associated with different control beams of the same cell.

12. The method of claim 9, wherein sequences for different control beams in the same cell belong to a set of sequences derived from a base sequence.

13. The method of claim 1, wherein additional OFDM symbols are padded before or after the pilot symbols to carry additional data symbols.

14. The method of claim 1, wherein a guard time is inserted between different control beams configured by the base station covering an entire service area of a cell.

15. A base station, comprising:
a resource allocation circuit that allocates a set of control resource blocks in a beamforming OFDM (Orthogonal Frequency-Division Multiplexing) network, wherein the set of control resource blocks comprises periodically allocated time-frequency resource blocks associated with a set of beamforming weights to form a control beam;

a pilot allocation circuit that partitions each resource block into a pilot part and a data part, wherein each resource block comprises M pilot structures and each pilot structure comprises L OFDM symbols, wherein pilot symbols are inserted once every K subcarriers for R times in each of the L OFDM symbols to form the pilot part while data symbols are inserted in the remaining resource elements to form the data part, and wherein M, L, K, and R are positive integers; and a radio frequency (RF) transmitter that transmits the pilot symbols and the data symbols via the control beam to a plurality of user equipments (UEs), wherein each pilot symbol in each of the $m^{th}$ pilot structures has a signal sequence $s_m$ with an offset $v_m$, wherein each $s_m$ is generated from a base sequence applied with a circular shift value of $v_m$, and wherein m is a repetition index for the M pilot structures that are associated with the same control beam.

16. The base station of claim 15, wherein the pilot symbols have the offset $v_m$ with respect to the 0-th subcarrier.

17. The base station of claim 15, wherein the R resource elements carrying the inserted pilot symbols in an OFDM symbol are modulated by $s_m$ to identify the control beam.

18. The base station of claim 15, wherein the base station configures a set of control beams to create a radiation pattern covering an entire service area of a cell.

19. The base station of claim 18, wherein each control beam of the cell is identified by the pilot symbols having a hopping pattern and a sequence.

* * * * *